(12) United States Patent
McKeon et al.

(10) Patent No.: US 9,315,259 B1
(45) Date of Patent: Apr. 19, 2016

(54) MORPHING SURFACES FOR THE CONTROL OF BOUNDARY LAYER TRANSITION

(75) Inventors: Beverley McKeon, Tujunga, CA (US); Kaushik Bhattacharya, Pasadena, CA (US); Michael Ortiz, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 874 days.

(21) Appl. No.: 12/455,467

(22) Filed: Jun. 2, 2009

Related U.S. Application Data

(60) Provisional application No. 61/130,632, filed on Jun. 2, 2008, provisional application No. 61/196,047, filed on Oct. 14, 2008.

(51) Int. Cl.
*B64C 21/10* (2006.01)

(52) U.S. Cl.
CPC ........................................ *B64C 21/10* (2013.01)

(58) Field of Classification Search
CPC .. B64C 21/10; B64C 2230/26; B64C 23/005; B64C 2003/445; B64C 2027/7288; B64C 23/00; B62D 35/00
USPC .................................. 244/200, 203, 123.1
See application file for complete search history.

(56) References Cited

U.S. PATENT DOCUMENTS

| | | | | |
|---|---|---|---|---|
| 2005/0121240 A1* | 6/2005 | Aase et al. | ................... | 180/68.1 |
| 2009/0065650 A1* | 3/2009 | McKeon et al. | ............. | 244/204 |
| 2011/0042524 A1* | 2/2011 | Hemmelgarn et al. | ....... | 244/203 |

* cited by examiner

*Primary Examiner* — Valentina Xavier
(74) *Attorney, Agent, or Firm* — Milstein Zhang & Wu LLC; Joseph B. Milstein

(57) ABSTRACT

A structure configured to modify its surface morphology between a smooth state and a rough state in response to an applied stress. In demonstrated examples, a soft (PDMS) substrate is produced, and is pre-strained. A relatively stiff overlayer of a metal, such as chromium and gold, is applied to the substrate. When the pre-strained substrate is allowed to relax, the free surface of the stiff overlayer is forced to become distorted, yielding a free surface having a roughness of less than 1 millimeter. Repeated application and removal of the applied stress has been shown to yield reproducible changes in the morphology of the free surface. An application of such morphing free surface is to control a boundary layer transition of an aerodynamic fluid flowing over the surface.

20 Claims, 24 Drawing Sheets

MORPHING SURFACES FOR THE CONTROL OF BOUNDARY LAYER TRANSITION

CROSS-REFERENCE TO RELATED APPLICATIONS

This application claims priority to and the benefit of U.S. provisional patent application Ser. No. 61/130,632, filed Jun. 2, 2008, and claims priority to and the benefit of U.S. provisional patent application Ser. No. 61/196,047, filed Oct. 14, 2008, each of which applications is incorporated herein by reference in its entirety. This application is also related to U.S. patent application Ser. No. 12/106,638, filed Apr. 21, 2008, and to U.S. patent application Ser. No. 12/117,959, filed May 9, 2008.

BACKGROUND OF THE INVENTION

1. Field of the Invention

The invention relates to systems and methods for controlling aerodynamic properties of surfaces in general and particularly to systems and methods that employ surfaces that can change their configuration in dimensions of millimeters or less.

2. Description of Related Art

For the Reynolds numbers typical of MAV flight ($Re_{chord}=10^4$-$10^5$ based on a velocity of order 10 m/s and a maximum linear dimension of 0.15 m), stimulation of transition of the airfoil boundary layer using surface roughness elements can be used to improve vehicle performance by delaying the onset of separation to stronger adverse pressure gradients (i.e. higher angles-of-attack or further downstream locations), thus increasing the peak lift-to-drag ratio at a given flow condition (e.g. FIG. 1 from Gad-el-Hak, "Micro-Air-Vehicles: Can They Be Controlled Better?" *AIAA J., Vol.* 28, No. 9, (1990) 1537-1552). Conversely, in flow regimes with less stringent pressure recovery requirements or higher Reynolds numbers, the turbulent boundary layers on rough airfoils lead to a reduction in performance compared to their smooth counterparts because of the increased skin friction drag associated with a thickening turbulent boundary layer and the associated increase in susceptibility to turbulent separation.

These arguments suggest that the agility of an MAV would be enhanced if the airfoil design process could incorporate a variably rough surface: one that is designed to be smooth at high Reynolds numbers, but rough when beneficial at lower Reynolds numbers (but not so rough as to unnecessarily thicken the boundary layer). A material that is capable of morphing on the scale of the surface roughness while forming an integral, possibly structural, part of the airfoil skin holds the promise of overcoming both the weight and power restrictions that impede implementation of many current active control schemes and the reduced high Reynolds number performance of permanently rough airfoils.

Advances in smart materials mean that there are an increasing number of modern materials that may be translated to new applications in the fluid mechanics arena. In this collaborative research, we seek to couple a known material instability with knowledge of the surface roughness required to cause boundary layer transition in canonical and applied flows.

Previous work falls into the categories of roughness-induced transition, devices to induce roughness in canonical and applied flow configurations and thin-film/substrate buckling.

The classical studies of the effects of distributed roughness on transition can be used to guide the required roughness amplitudes. For example, the prior art indicates that transition can be induced in a Blasius boundary layer at Reynolds numbers as low as $Re_{\delta*}$~300 for single three-dimensional roughness elements or $Re_{\delta*}$~1000 for two-dimensional roughness (transition occurs close to the roughness if the amplitude, k, is of the same order as the local boundary layer displacement thickness, $k/\delta*$~1, compared to a natural transition Reynolds number for a smooth wall in his experiments of $Re_{\delta*}$~2600 (where $\delta*$ is the displacement thickness at the transition location). The prior art has described applications of MEMs technologies to control of separation on MAV airfoils, indicating that a Gaussian bump with (time-dependent) amplitude of order ten viscous units would provide sufficient local acceleration to suppress incipient separation. More peripherally relevant are previous studies of membrane wing aerodynamics (e.g. Lian 2003) and the computational study of a "dynamic", or time-dependent, roughness for the control of laminar boundary layer separation from an airfoil (e.g., Honsaker 2005).

There is a need for systems and methods that permit the control of surfaces for use in aerodynamic applications.

SUMMARY OF THE INVENTION

In one aspect, the invention features an aerodynamic surface configured to permit control of boundary layer transition. The aerodynamic surface comprises a substrate having a pre-defined strain, the substrate having a first surface configured to be fixed to an airfoil, and having a second surface; an overlayer adjacent the second surface of the substrate, the overlayer configured to provide a free surface to an aerodynamic fluid flow, the overlayer and the substrate having a relative strain mismatch as produced, the overlayer and the substrate having different respective responses to an applied stress; and a stressor configured to apply a stress to at least a selected one of the substrate and the overlayer. The aerodynamic surface presents a selected one of a smooth surface and a rough surface to the aerodynamic fluids flow in response to the applied stress.

In one embodiment, the substrate is a soft material. In one embodiment, the substrate is polydimethylsiloxane (PDMS) elastomer. In one embodiment, the overlayer is a metal. In one embodiment, the metal is a selected one of chromium and gold. In one embodiment, the stressor is configured to apply a thermal stress to the substrate. In one embodiment, the stressor is an electrical heater. In one embodiment, the stressor is configured to apply a mechanical stress to the substrate. In one embodiment, the stressor is configured to apply a thermal stress to the overlayer. In one embodiment, the stressor is configured to apply a mechanical stress to the overlayer.

In another aspect, the invention relates to a method of controlling a boundary layer transition at an aerodynamic surface. The method comprises the steps of providing on an airfoil a structure defining an aerodynamic surface, the structure comprising a substrate having a pre-defined strain, the substrate having a first surface configured to be fixed to the an airfoil, and having a second surface; an overlayer adjacent the second surface of the substrate, the overlayer configured to provide a free surface to an aerodynamic fluid flow, the overlayer and the substrate having a relative strain mismatch as produced, the overlayer and the substrate having different respective responses to an applied stress; and a stressor configured to apply a controlled stress to at least a selected one of the substrate and the overlayer; and applying a controlled stress to a selected one of the substrate and the overlayer, the controlled stress calculated to control a morphology of the free surface of the structure between a smooth state and a rough state. The aerodynamic surface presents a selected one of a smooth surface and a rough surface to the aerodynamic fluids flow in response to the applied controlled stress to control a boundary layer transition of the aerodynamic fluid flowing over the aerodynamic surface.

In one embodiment, the substrate is a soft material. In one embodiment, the substrate is polydimethylsiloxane (PDMS) elastomer. In one embodiment, the overlayer is a metal. In one embodiment, the metal is a selected one of chromium and gold. In one embodiment, the stressor is configured to apply a thermal stress to the substrate. In one embodiment, the stressor is an electrical heater. In one embodiment, the stressor is configured to apply a mechanical stress to the substrate. In one embodiment, the stressor is configured to apply a thermal stress to the overlayer. In one embodiment, the stressor is configured to apply a mechanical stress to the overlayer.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
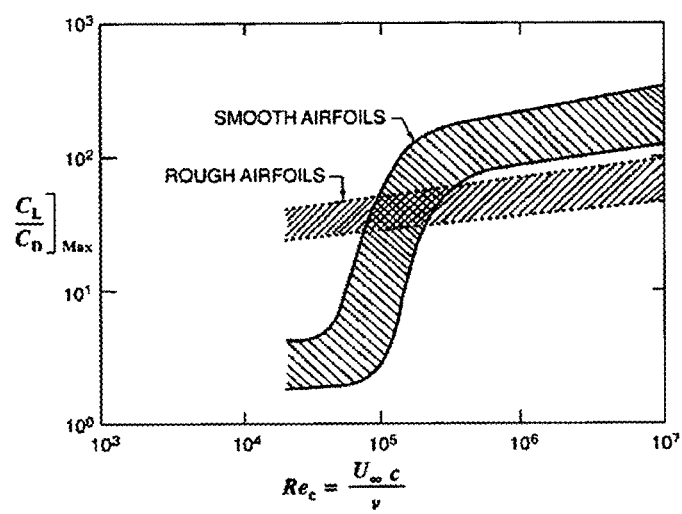
FIG. 1 is a diagram showing a relationship known in the prior art between peak lift-to-drag ratio as a function of chord Reynolds number.

Micro Air Vehicles (MAVs) are miniature unmanned aerial vehicles that operate in the range of chord Reynolds numbers from $10^4$-$10^5$. A laminar boundary layer in this low Reynolds number regime is susceptible to flow separation at modest angles of attack, while a turbulent boundary layer is capable of withstanding higher adverse pressure gradients without separating. However, as the Reynolds number increases, the buildup of a turbulent boundary layer increases skin friction drag which also leads to flow separation.

We have investigated the use of morphing surfaces for the control of boundary layer transition as a means to improve the flight performance of MAVs. While the present discussion is presented in terms of MAVs, the same principals are expected to be applicable to laminar flow aircraft. By utilizing the inherent elastic buckling instability of a stiff thin film bonded to a soft substrate subject to a strain mismatch, the surface can be morphed from smooth to rough for the stimulation of transition. Furthermore, the material properties can be tailored to satisfy the requirements needed to avoid the separation condition. One embodiment of morphing surfaces were fabricated by depositing a chromium film on a polydimethylsiloxane (PDMS) elastomer substrate that was pre-strained by thermal expansion; relieving this pre-strain caused the film to wrinkle. Characterization of the wrinkles was done using a custom built scanning laser displacement system, and the effects of film thickness and strain mismatch level on the amplitude and wavelength of the wrinkles were experimentally determined and compared to existing theory. Values of ~15-70 μm for wavelengths and ~8-40 μm for amplitudes were found, which were similar to theoretical predictions. Temperature was investigated as a control mechanism for the activation of the morphing surfaces, which was implemented by applying a current across an embedded resistance heating wire, and the reversibility of the morphing characteristics was demonstrated.

The buckling of internally stressed stiff layers on soft substrates has been studied extensively in the context of geological folding, layered structural panels, nanostructured materials and flexible electronics, which are very different fields from aerodynamic surfaces and their applications. These studies have established through theory and experiment the relation between the wrinkles and material parameters. We now present an experimental and theoretical investigation of the use of the elastic thin film buckling instability to introduce a reactive, morphing surface capable of controlling separation by advancement of boundary layer transition at the unsteady, high laminar Reynolds numbers representative of agile Micro-Air Vehicles. We demonstrate that one can make use of buckling behavior of a thin film of an internally stressed, stiff material (metal) on a soft substrate (elastomer/foam), which has been used previously in very different applications (for example, to provide flexible metallic connectors for connecting circuit elements), as a surface roughness boundary condition with an amplitude that is dependent on the local pressure imposed by the flow configuration (above a critical buckling pressure). Thus, although the control method is passive in that there is no external power requirement, it is also reactive because by appropriate selection of film and substrate properties (namely elastic moduli, pre-stress and layer thicknesses) the buckling pressure-deformation amplitude relationship can be tailored to give a Reynolds number-dependent (or angle-of-attack-dependent) surface condition.

Suitably deployed, the material offers the potential to exploit the favorable separation-resistant properties of the turbulent boundary layer by inducing transition in a laminar boundary layer that would otherwise separate. It is proposed that, among other applications, such a control methodology could be exploited to improve low Reynolds number airfoil performance in the quasi-steady and unsteady flows typical of agile Micro Air Vehicles at minimal cost. Since the control mechanism represents a bulk manipulation of morphology of a surface that would form an integral part of the airfoil skin, the incurred cost penalties would be zero or negligible in terms of weight, size and power.

We expect to develop and characterize a passive material that can be used to avert laminar separation in steady and unsteady flow on fixed, low Reynolds number airfoils typical of Micro Air Vehicles (MAVs) by exploiting the receptivity of pre-transitional boundary layers to wall roughness. However, we wish to state explicitly that, as of the time of this writing, we do not know how to make such purely passive elements that will be suitable for use in MAVs, and that this document does not provide an enabled disclosure for such purely passive technology. Small roughness disturbances at the wall will be generated in a controlled manner by the elastic buckling instability in a thin film on a soft substrate. Such a composite material could be used to exploit the benefits of passively inducing an (attached) turbulent boundary layer in flow regimes where a laminar one would separate, leading to a loss of lift and an increase in pressure drag that far exceeds the turbulent skin friction penalty.

The primary goals that we set out to demonstrate are as follows:

demonstration of thin film/substrate buckling as a passive, reactive means of inducing transition of a canonical laminar boundary layer;

identification a model coupling the pressure imposed on the thin film by the flow, the buckling instability, the receptivity of the fluid to the resulting change in the wall roughness and downstream transition location;

design of a methodology for the specification of thin film-substrate combinations with buckling characteristics that can be matched to experimental conditions for optimal control of laminar separation by inducing boundary layer transition;

demonstration of thin film/substrate buckling as a means of manipulating the critical Reynolds number in steady and unsteady bluff body flow by controlling the separation point; and preliminary investigation of the extension of the method to control of unsteady flow over low Reynolds number airfoils.

This approach exploits modification of the properties of the surface beneath a laminar boundary layer rather than the interaction of the flow with discrete actuators in order to manipulate the boundary layer characteristics. The present approach differs from the numerous studies of the viscoelastic response of optimized compliant surfaces, which have been demonstrated to delay transition in water for linear mechanisms and recent work by Huang & Johnson for bypass transition) by stabilizing linear disturbances to laminar flow. Here a material instability (arising from the minimal strain energy configuration associated with the balance of energy required to bend the stiff thin film and to deform the softer substrate) is used to generate a surface roughness condition that will destabilize the flow.

Stiff Compressed Film on a Soft Substrate

We consider a thin film of a stiff material (metal) on a soft substrate (elastomer/foam). The film has a uni-axial mismatch strain $\delta_m$ relative to the substrate. We assume that this mismatch is compressive (i.e., $\epsilon_m < 0$). This causes the film to buckle or wrinkle in an attempt to relieve the mismatch stress. This is of course resisted by the substrate and this competition sets up wave-length and magnitude of the buckling pattern. Thus the characteristics of the wrinkles depend on the elastic modulus of the substrate.

The film and substrate are subjected to a normal pressure p. This leads to a uniform compression of the substrate. This in turn causes the elastic modulus of the substrate to change. We can choose materials such that the elastic modulus decreases (elastomer) or increases (foam) with increasing pressure. This change in modulus in turn causes a change in the wrinkling pattern.

To understand the wrinkling, we treat the film using von-Karman plate theory and the substrate as a (linear) elastic half space. We consider only one-dimensional buckling patterns or ripples. If u and w are, respectively, the in-plane and out-of-plane components of displacement of the film, then the von-Karman plate equations are:

$$\bar{E}_f h_f \left( \varepsilon_m + u' + \frac{1}{2}(w')^2 \right) = T \tag{1}$$

$$\frac{\bar{E}_f h_f^2}{12} w'''' - T w'' + f = 0 \tag{2}$$

where $\bar{E}_f$ and $h_f$ are the plane stress modulus and thickness of the film, T is an a priori unknown tangential force in the film and f is the normal pressure exerted by the substrate on the film. The relation between f and w are given by treating the substrate as an elastic foundation:

$$w' = \frac{2}{\pi \bar{E}_s} \int_{-\infty}^{\infty} \frac{f(\xi)}{\xi - x} d\xi \tag{3}$$

where $\bar{E}_s$ is the modulus of the substrate. We look for a solution of the form $$w = w_0 \cos \frac{2\pi x}{\lambda}. \tag{4}$$

where $\lambda$ is the wave-length of the ripples.

A little calculation shows that $$\frac{\lambda}{h_f} = \pi\left(\frac{8\overline{E}_f}{3\overline{E}_s}\right)^{1/3} \quad (5)$$

$$\frac{w_0}{\lambda} = \frac{1}{\lambda}\left(-\left(\frac{3\overline{E}_s}{8\overline{E}_f}\right)^{2/3} - \varepsilon_m\right)^{1/2} \approx \frac{\sqrt{-\varepsilon_m}}{\pi} \quad (6)$$

Now, the ratio $\overline{E}_f/\overline{E}_s$ of elastic moduli of metals to that of polymers can range from 100 to 10,000. Further, the mismatch strain can be in the range 0.05 to 0.2. This means that the wavelength can be 20 to 90 times the thickness of the film (smaller wavelength corresponds to stiffer substrate), and the amplitude about a tenth of the wavelength. With a film thickness of a micron, the amplitude is 2 to 9 microns and wavelength 20 to 90 microns.

A model of the boundary layer-thin film interaction will be sought to enable this analysis to be optimized for airfoil flows, including incorporation of effects of the finite extent of the thin film and local pressure gradients and a sensitivity analysis of the coupling between dynamic variations in the surface pressure distribution and the buckling behavior.

Experimental Provocation of Transition

Experiments with an external flow will be conducted primarily in the Merrill laboratory wind tunnel at Caltech (0.6× 0.6×2.4 m test section with=3.3×10$^6$/m) and the Lucas Adaptive Wall Wind Tunnel (1.5×1.8×7.6 m test section with Re$_x$=4.4×10$^6$/m). The primary experiment will consist of a flat plate in a test section with a variable height ceiling, such that the local pressure, pressure gradient and Reynolds number experienced by a flush-mounted panel of the thin-film/substrate composite can be continuously varied. To achieve Re$_{\delta^*}$~1000 with k/$\delta^*$~1, maximum amplitudes of the order of 0.1-1 mm will be required. The properties of the composite panels will be designed to permit the investigation of deformation under constant pressures and severe spatial and temporal pressure gradients. The in situ (dynamic) thin film deformation will be measured using a stereo high-speed camera surface measurement system, which can be run concurrently with Particle Image Velocimetry techniques, to capture the fluid-structure interaction. Hot wire anemometry will be used to determine the influence of the wall roughness on the path to transition and the degree of control over the streamwise location that can be achieved for different panel geometries.

Figure 2:
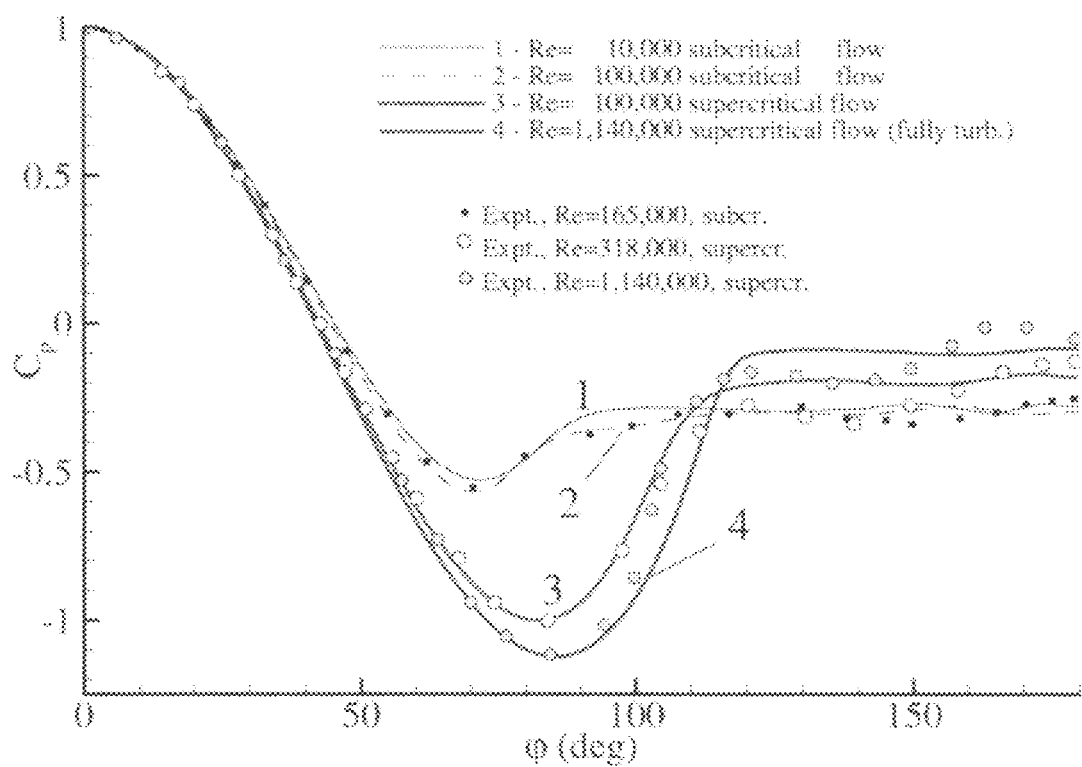
FIG. 2 is a diagram showing the distribution of pressure coefficient on a sphere with angle from a front stagnation point.

Tailoring the thin film stress-strain curve for a specific set of flow conditions, i.e. a specific airfoil and range of operation, requires knowledge of the variation of the surface pressure distribution and separation characteristics with angle of attack. In some situations, it may be useful to analyze the thin-film buckling concept in a canonical sphere flow, in which these relationships are known (e.g. FIG. 2) and surface curvature becomes important to the modeling of the surface deformation. The roughness amplitudes required to induce turbulent separation in steady flow at Reynolds numbers up to an order of magnitude below the critical value for a smooth surface are described in the literature as k/D=1.50-12.50× 10$^{-3}$ for sand-grain type roughness or k/D=9×10$^{-3}$ for golf-ball-like dimples. Thus for a sphere of 0.1 m diameter, the required buckling amplitudes in a panel covering the front hemisphere are of the same order as the flat plate experiment, and it is required that the amplitude decrease with increasing Reynolds number (i.e. with decreasing pressure, as indicated by a constant value of pressure coefficient, $C_p$) for a fixed sphere diameter as the disturbance required to induce transition decreases in magnitude. A combination of measured surface pressure distributions and external force balance measurements will be used to characterize separation at different Reynolds numbers (and hence surface pressure distributions and receptivity) for a thin film located upstream of the minimum pressure point on the sphere. Both steady and unsteady freestream velocities will be investigated.

It is expected that the demonstration of these approaches would pave the way for detailed studies on the use of morphing via elastic thin film buckling as a reactive mechanism to expand MAV flight envelopes. It is expected that future work will include testing typical MAV designs under suitably-chosen ranges of steady and unsteady conditions and outlining the implications of this technology for the airfoil design process.

This is a study of a surface that is compliant in the mean sense, rather than with respect to linear disturbances. An understanding of the spatial and temporal development of the laminar and transiting boundary layer will offer additional insight into influence of roughness on transition.

In the longer term, it is expected that optimized passive and active morphing surfaces offer a potential means to augment, or partially replace, traditional control devices on higher Reynolds number airfoils. The material requirements associated with this different Reynolds number regime, along with the impact in terms of weight and fuel efficiency gains associated with the replacement of mechanical control surfaces by morphing surfaces, are subjects of ongoing investigation. However, it is not presently known how such a system would be made operational in the absence of deliberately applied control signals. It is also not presently known how to construct such a system that would operate under some type of predictive control, that is, control that would modify the surface roughness in a manner calculated to optimize a surface for some desired operational condition.

Characterization of the timescales of the buckling response will permit future analysis of the feasibility of developing a system that utilizes the small-amplitude buckling regime of thin films and an optical imaging apparatus as a means of sensing surface pressure distributions. An additional application of this technology could include generation of repeatable, controllable two-dimensional roughness geometries for fundamental investigations of the effect of roughness on turbulent boundary layers.

Application of the Morphing Surface Tecnology to MAVs

Micro Air Vehicles (MAVs) are miniature unmanned aerial vehicles (UAVs) capable of autonomous flight with applications ranging from reconnaissance and scientific sampling to search and rescue missions. Typical fixed-wing MAV airfoil chord lengths are less than 0.15 m with operating velocities on the order of 10 m/s, resulting in low chord Reynolds number (10$^4$-10$^5$) operation. A laminar boundary layer in this range of chord Reynolds numbers is susceptible to boundary layer separation caused by adverse pressure gradients, with separation occurring near the leading edge of the airfoil at modest angles of attack. Separation of the flow from the airfoil surface results in a large increase of the pressure drag, which can lead to stall. A turbulent boundary layer is capable of withstanding higher adverse pressure gradients without undergoing separation, with the result that higher angles of attack can be achieved; thus, it is desirable to artificially induce the transition to turbulent flow at a point before laminar separation occurs in order to improve flight performance. One of the simplest passive methods of inducing transition is through the use of fixed roughness elements on the surface of the airfoil, with the height of the roughness on the same order as the boundary layer thickness.

However, as the chord Reynolds number increases above $10^5$, the presence of roughness causes a thickening of the turbulent boundary layer, leading to an increase in skin friction drag and possible flow separation. This decreases the airfoil effectiveness as measured by the peak lift-to-drag ratio, $C_L/C_D$. FIG. 1 illustrates that rough airfoils are capable of higher lift-to-drag ratios than smooth airfoils for Reynolds numbers below $10^5$, while smooth airfoils provide increased performance at higher Reynolds number values.

An ideal airfoil for operation in this range of Reynolds number would be able to morph its surface from rough to smooth in relation to the chord Reynolds number in order to optimize flight performance. Due to the small scale of MAVs, the method of controlling boundary layer transition must be extremely small in size and light weight.

The elastic buckling instability of a stiff thin film bonded to a compliant substrate subject to a strain mismatch was utilized to create the desired morphing surfaces. This phenomenon has been observed using various material combinations. We have fabricated gold and chromium films in 100-500 nm thicknesses bonded to a polydimethylsiloxane (PDMS) substrate using a contact printing method, and a equi-biaxial strain mismatch between the film and substrate caused the film to wrinkle in a predictable manner in order to relieve the compressive stresses experienced.

Figure 3:
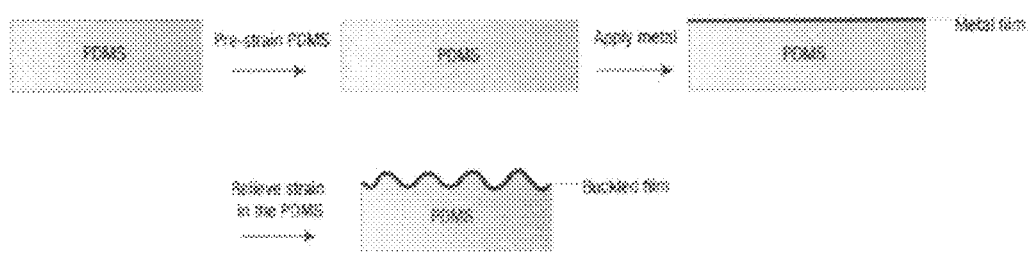
FIG. 3 is a flow diagram illustrating a fabrication procedure for a surface exhibiting thin film buckling.

FIG. 3 is a flow diagram illustrating a fabrication procedure for a surface exhibiting thin film buckling. As illustrated in FIG. 3, a soft material such as PDMS is provided as a substrate. The substrate is pre-strained. A stiff material such as a metal is applied as an over layer or overcoating on top of the pre-strained substrate, to form a smooth surface. When the strain in the substrate is removed, the interaction between the overlayer and the substrate induces a buckling to occur, thereby yielding a "morphed" or distorted surface. As is shown hereinafter, the morphing can be reversible in response to a level of strain that is present in the substrate as compared to the overlayer.

For a nonlinear soft substrate, external pressure will induce changes in its elastic modulus. Thus, it is suggested that the pressure change on an airfoil surface will provide a passive means for control of the roughness features. As previously stated, it is not presently known how this is to be accomplished. The material properties of the composite morphing surface can be tailored so that desired roughness is achieved at low Reynolds numbers, while a smooth surface is present when skin friction drag becomes important. The morphing surface would be part of the airfoil structure itself, leading to no added weight or space penalties, and would require no power for operation due to its passive nature.

Determination of Boundary Layer Height at Separation

Figure 4:
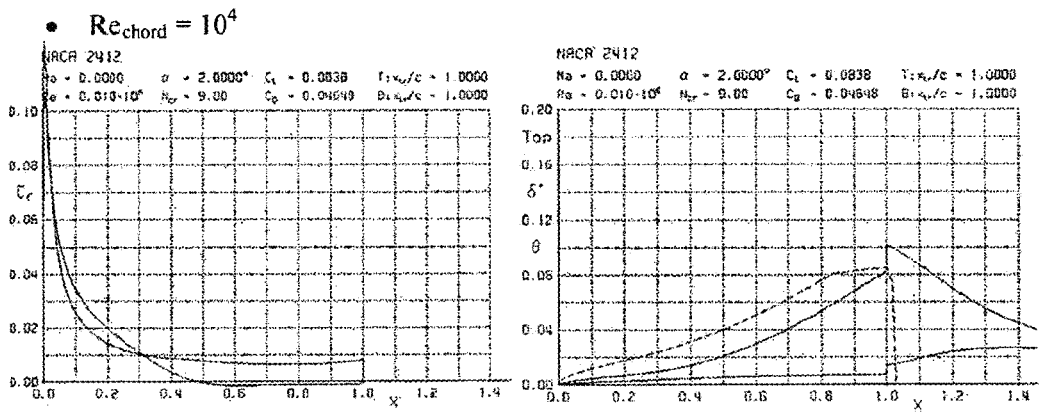
FIG. 4 is a diagram showing plots of Cf (left panel) and δ(right panel) as a function of distance along the chord of a NACA 2412 airfoil for Re=$10^4$ from X-Foil
Figure 5:
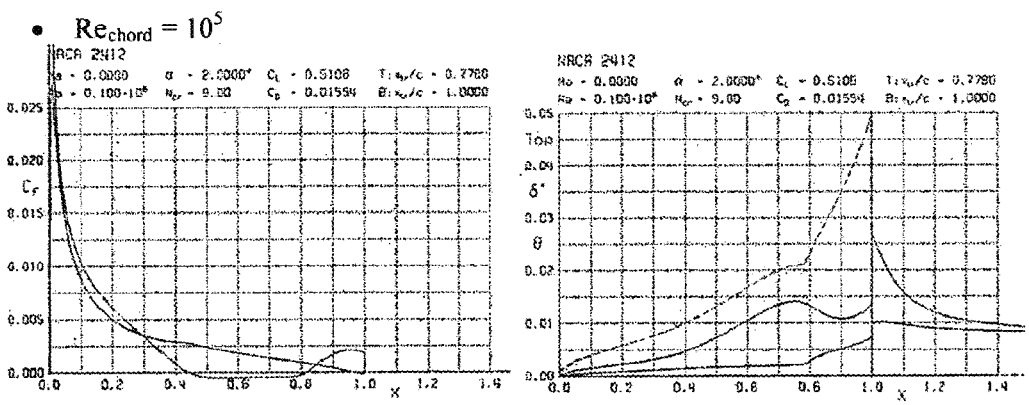
FIG. 5 is a diagram showing plots of Cf (left panel) and δ(right panel) as a function of distance along the chord of a NACA 2412 airfoil for Re=$10^5$ from X-Foil.

In order to determine the wrinkle height needed to stimulate transition, the boundary layer thickness, δ, at the location of separation was theoretically determined for chord Reynolds numbers of $10^4$ and $10^5$ using Xfoil. A NACA 2412 airfoil was simulated with an angle of attack chosen to be $\alpha=2°$ as an estimation of the standard MAV flight condition. Data from the simulation is provided in FIG. 4 and FIG. 5; the left side graphs plot skin friction coefficient, $C_f$, which is zero at the point of separation; the right hand graphs display boundary layer thickness as a dotted line, with displacement thickness and momentum thickness plotted as solid lines successively below. All of the axes use units of percent chord length, c.

TABLE 1

Summary of data from Xfoil simulation of boundary layer thickness.

| Chord Re # | Separation Location | Boundary Layer Height at Separation |
|---|---|---|
| $10^4$ | 0.49c | 0.038c |
| $10^5$ | 0.45c | 0.012c |

The boundary layer thickness values in Table 1 determined using Xfoil agree well with the approximate Blasius solution for a laminar boundary layer over a flat plate, thus lending validity to the simulation. The separation location and boundary layer height are all given as a fraction of the airfoil chord length, c. We assumed that a roughness height that is 10% of the boundary layer thickness would be sufficient to induce transition in a laminar flow at the chord Reynolds numbers of interest. This results in wrinkle heights of 0.0035c and 0.0011c for chord Reynolds numbers of $10^4$ and $10^5$, respectively, or ~150 μm for a typical MAV.

Observation of Wrinkles

Wrinkles were observed for morphing surfaces with chromium and gold films applied in varying film thicknesses. Optical micrographs showing the overall wrinkle pattern were obtained for each surface, shown in FIG. 6 and FIG. 7. A custom built laser scanning system (see FIG. 22) provided topographical images for characterization of the surfaces, which are shown in FIG. 8 and FIG. 9.

Plots of Wrinkle Wavelength and Amplitude

Figure 10:
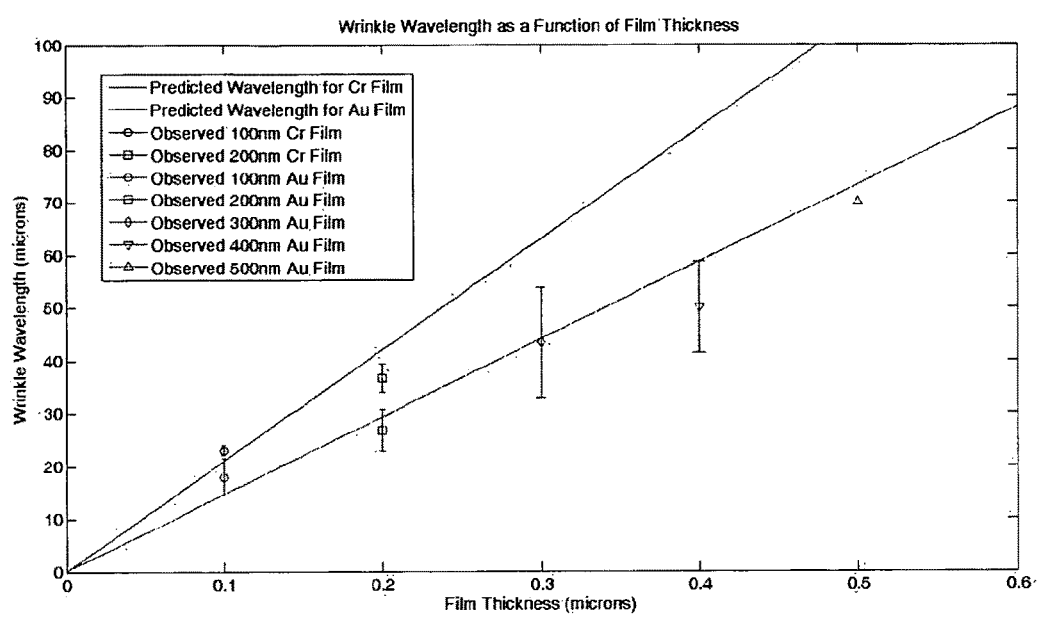
FIG. 10 is a graph illustrating observed and expected values of wavelength as a function of film thickness and composition.
Figure 11:
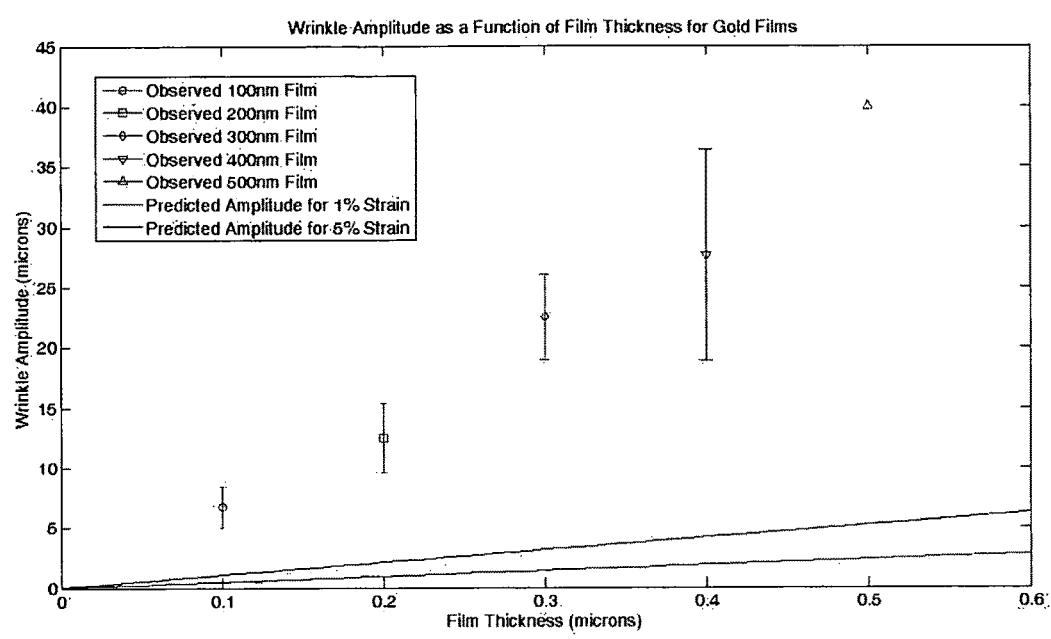
FIG. 11 is a graph illustrating observed and expected values of wrinkle amplitude as a function of film thickness and composition.

Wavelength and amplitude values determined from examination of the laser scanning images are plotted along with expected values in FIG. 10 and FIG. 11. The predicted values were obtained using Equation (1) with $E_f=279$ GPa, $v_f=0.21$, $E_s=1.5$ MPa, and $v_s=0.48$.

Wrinkle Reversibility Control

Figure 12:
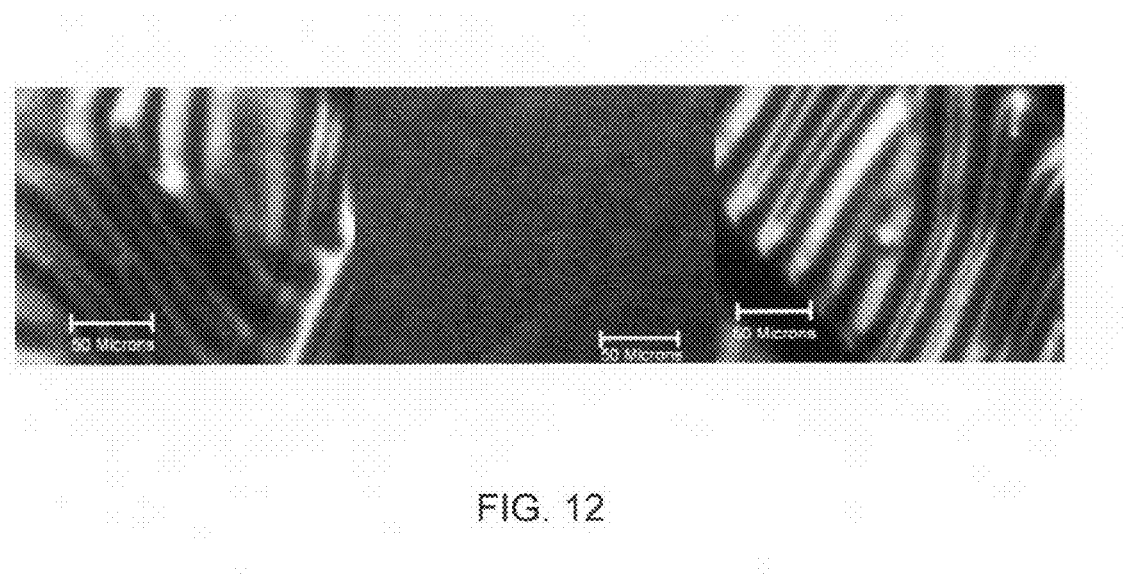
FIG. 12 is an illustration of the behavior of a surface with initial wrinkles (left panel), strain mismatch relieved (center panel), and re-application of the strain mismatch (right panel), as observed using optical micrographs.
Figure 13A:
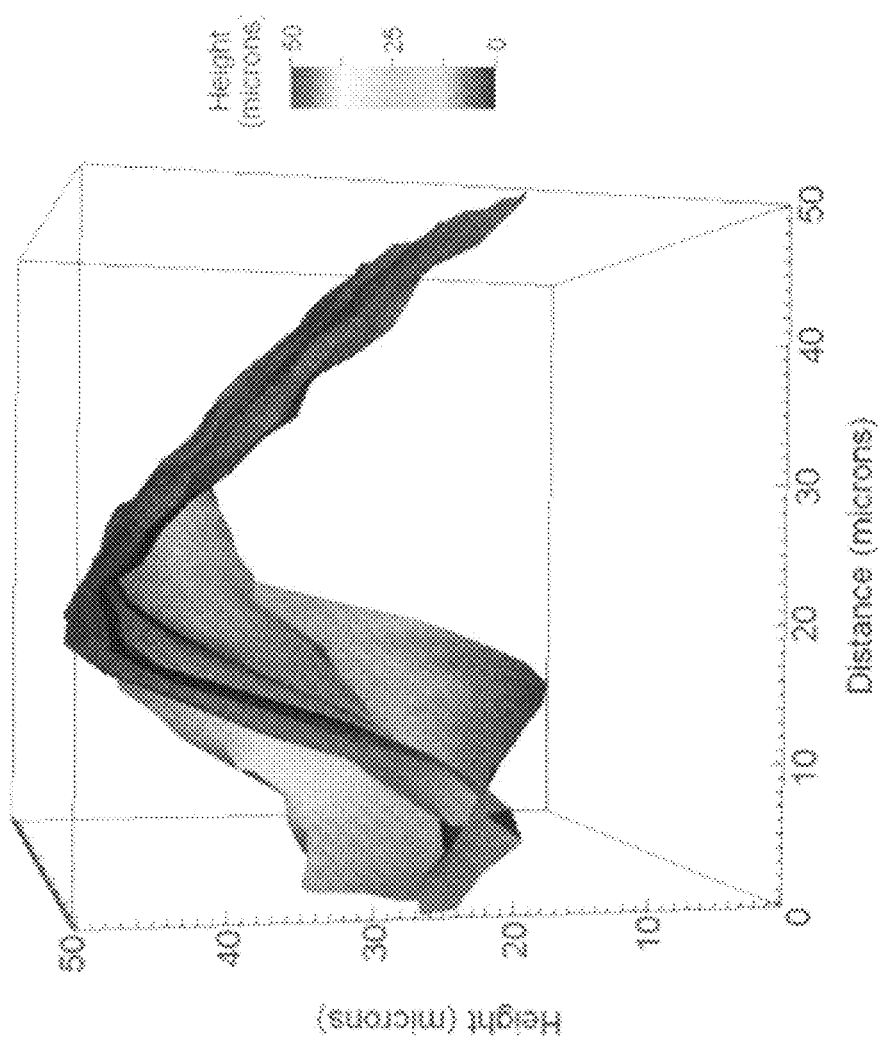
FIG. 13 is an illustration of the behavior of a surface exhibiting wrinkle reversibility as observed using topographical images.
Figure 13B:
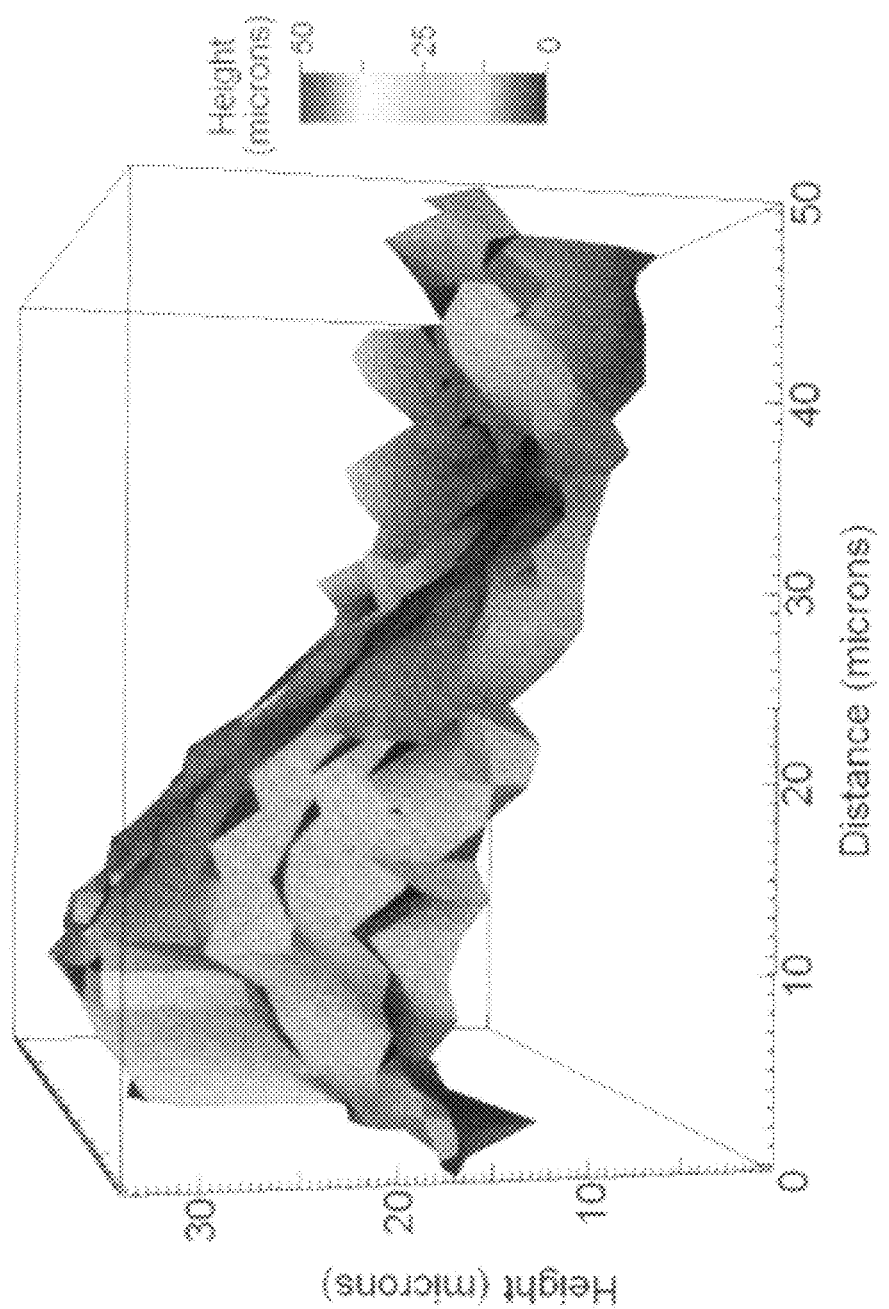
Figure 13C:
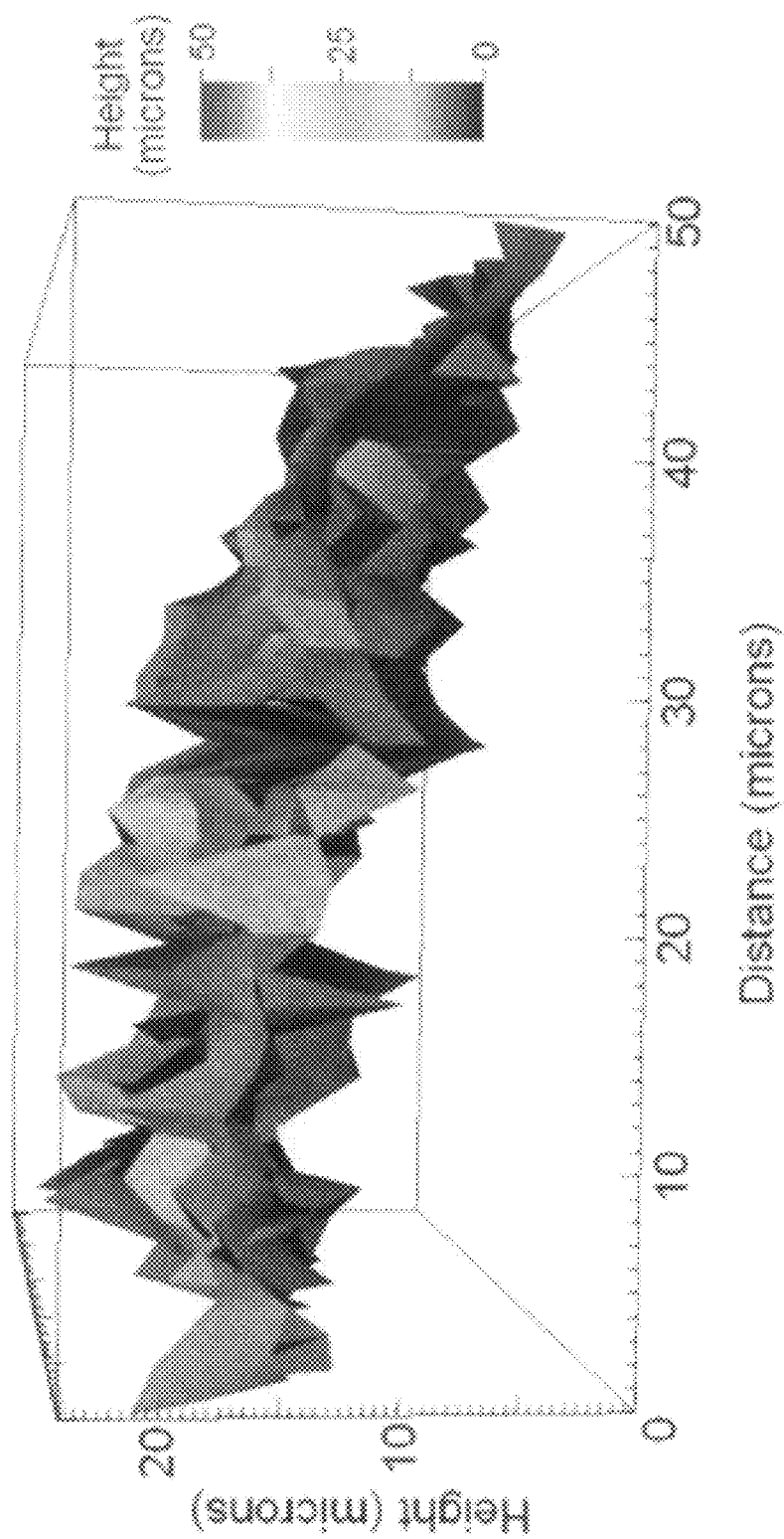

Control of the wrinkling characteristics was demonstrated by re-heating the PDMS using embedded resistance heating wire in order to relieve the strain mismatch and cause the wrinkle amplitude to decrease; subsequent cooling of the sample prompted the wrinkles to re-form. FIG. 12 shows optical microscope pictures of this process. FIG. 13 shows topopgraphical images of wrinkle reversibility obtained by scanning laser characterization.

Wrinkle Fatigue Cycling

Figure 14:
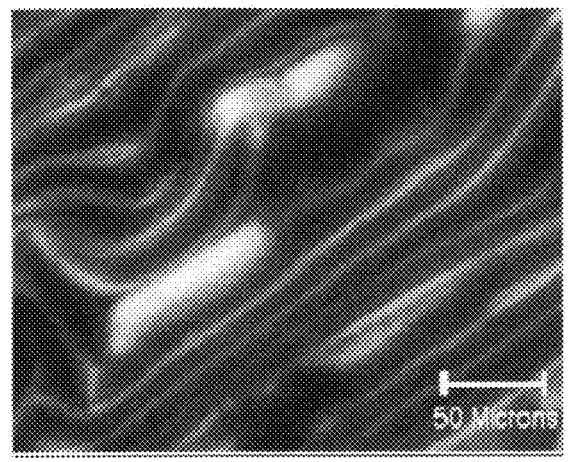
FIG. 14 is an illustration of a morphing surface after 10 morphing cycles, as observed using optical micrographs.

A morphing surface sample was fatigue tested up to ten full morphing cycles. Optical microscopy was performed to determine if wrinkle degradation occurred. FIG. 14 is an optical micrograph of the surface of a sample after the ten morphing cycles were performed.

Nested Wrinkles

Figure 15:
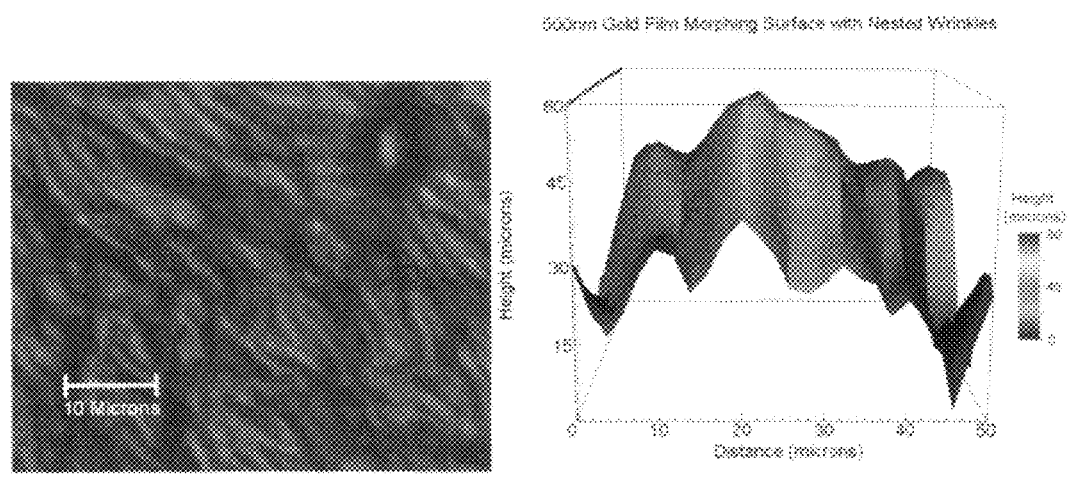
FIG. 15 is an illustration of a morphing surface exhibiting small, nested wrinkles as observed using optical micrography (left) and topographical imaging (right). The left image was taken from a 100 nm gold film morphing surface, and the right from a 500 nm gold film morphing surface.

High resolution optical microscopy revealed smaller, nested wrinkles on the surface of each sample. The left pane of FIG. 15 is an optical micrograph of the nested wrinkles and apparent resolution of these hierarchical structures by the scanning laser system, taken from a 100 nm gold film morphing surface. The right pane of FIG. 15 is a topographical image showing small, nested wrinkles, taken from a 500 nm gold film morphing surface.

Figure 6:
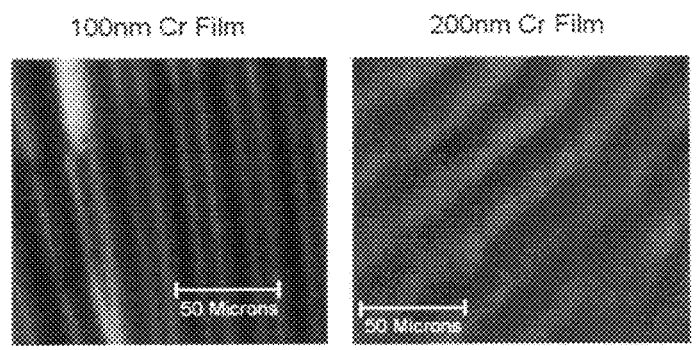
FIG. 6 is an illustration of chromium film morphing surfaces (100 nm Left panel, 200 nm Right panel) as observed using optical micrographs.
Figure 7:
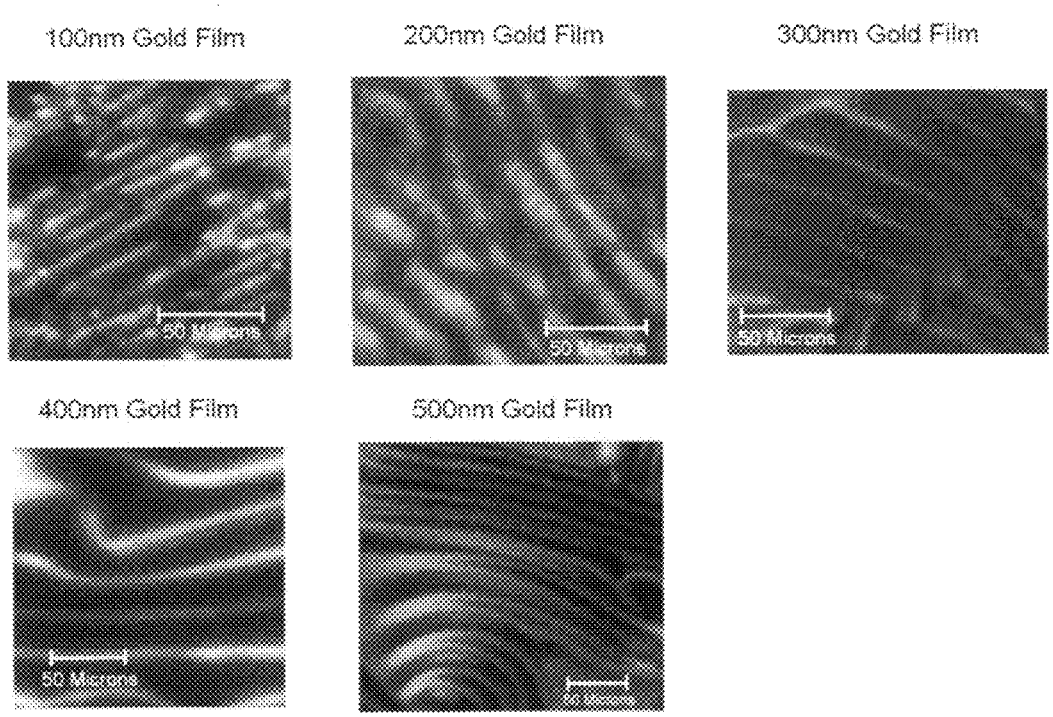
FIG. 7 is an illustration of gold film morphing surfaces (100 nm to 500 nm) as observed using optical micrographs.
Figure 8A:
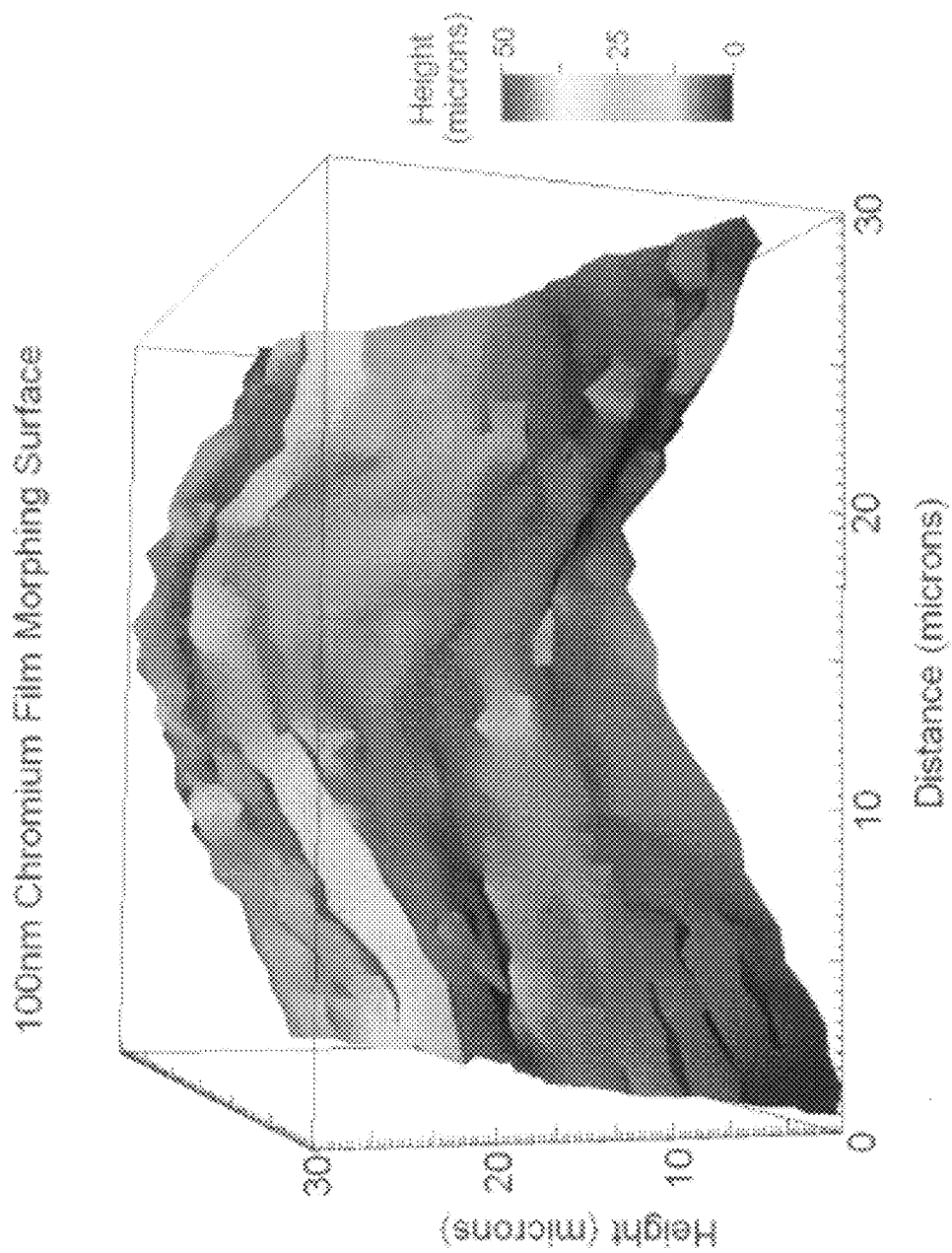
FIG. 8 is an illustration of chromium morphing surfaces (100 nm Left panel, 200 nm Right panel) as observed using topographical images.
Figure 8B:
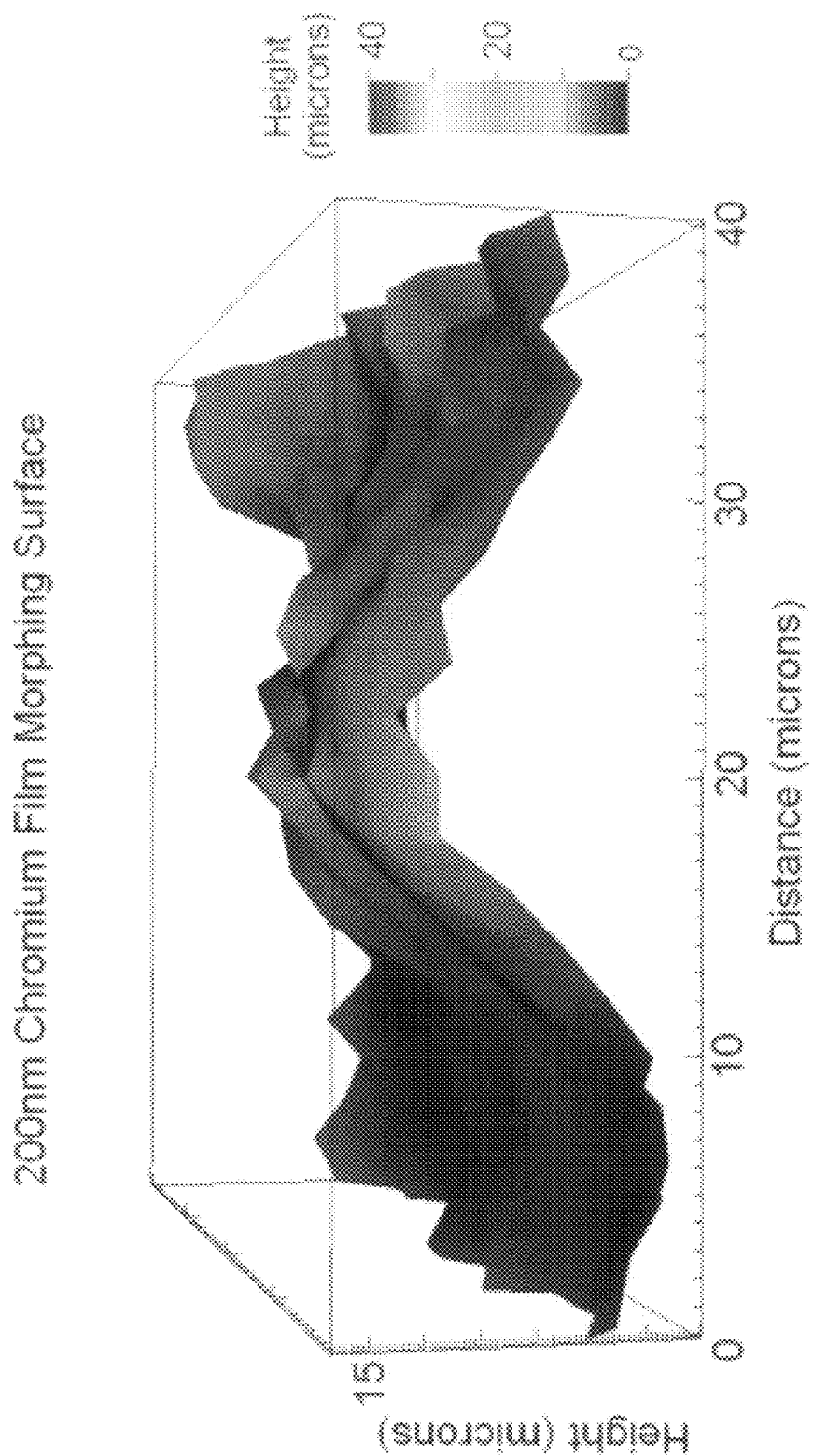
Figure 9A:
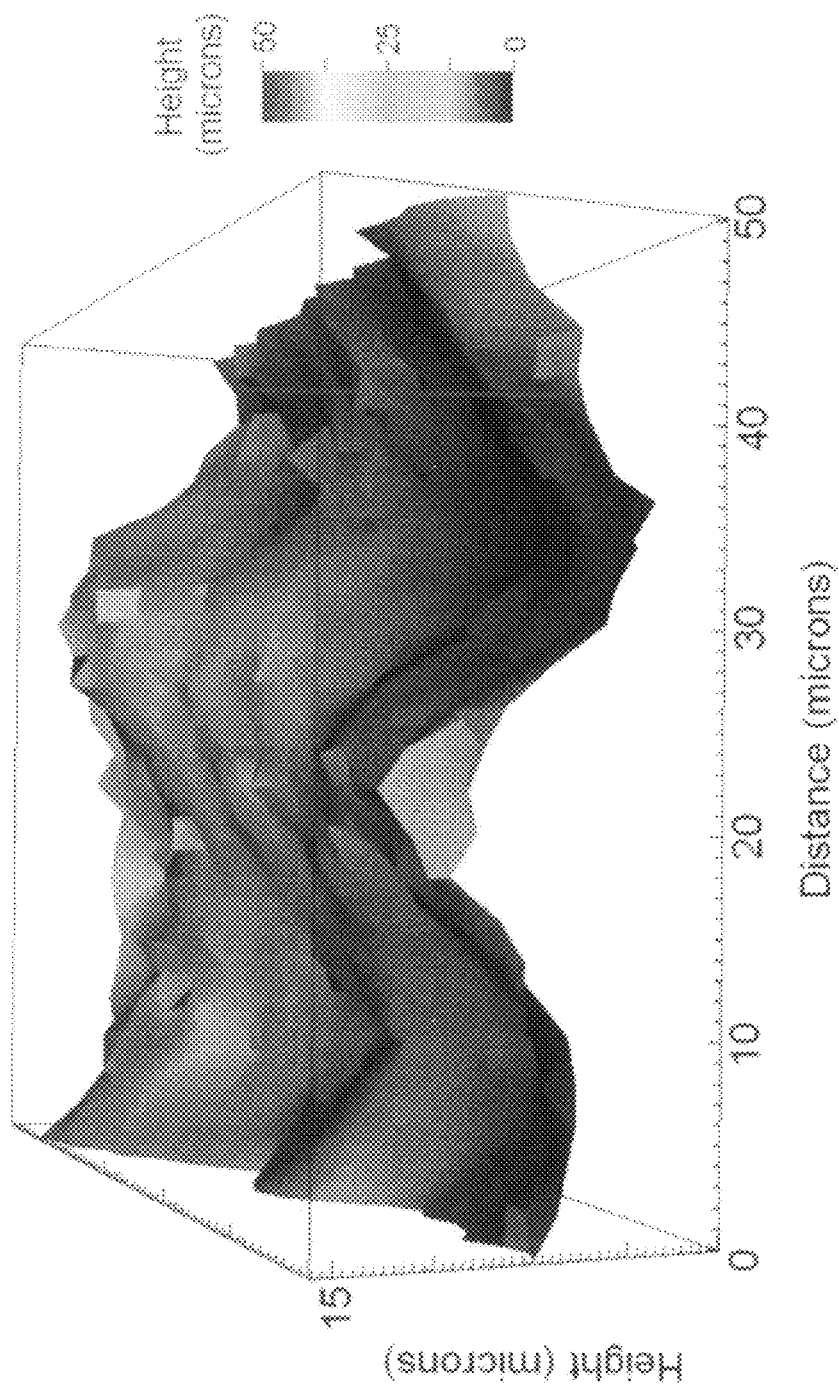
FIG. 9 is an illustration of gold morphing surfaces (100 nm to 500 nm) as observed using topographical images.
Figure 9B:
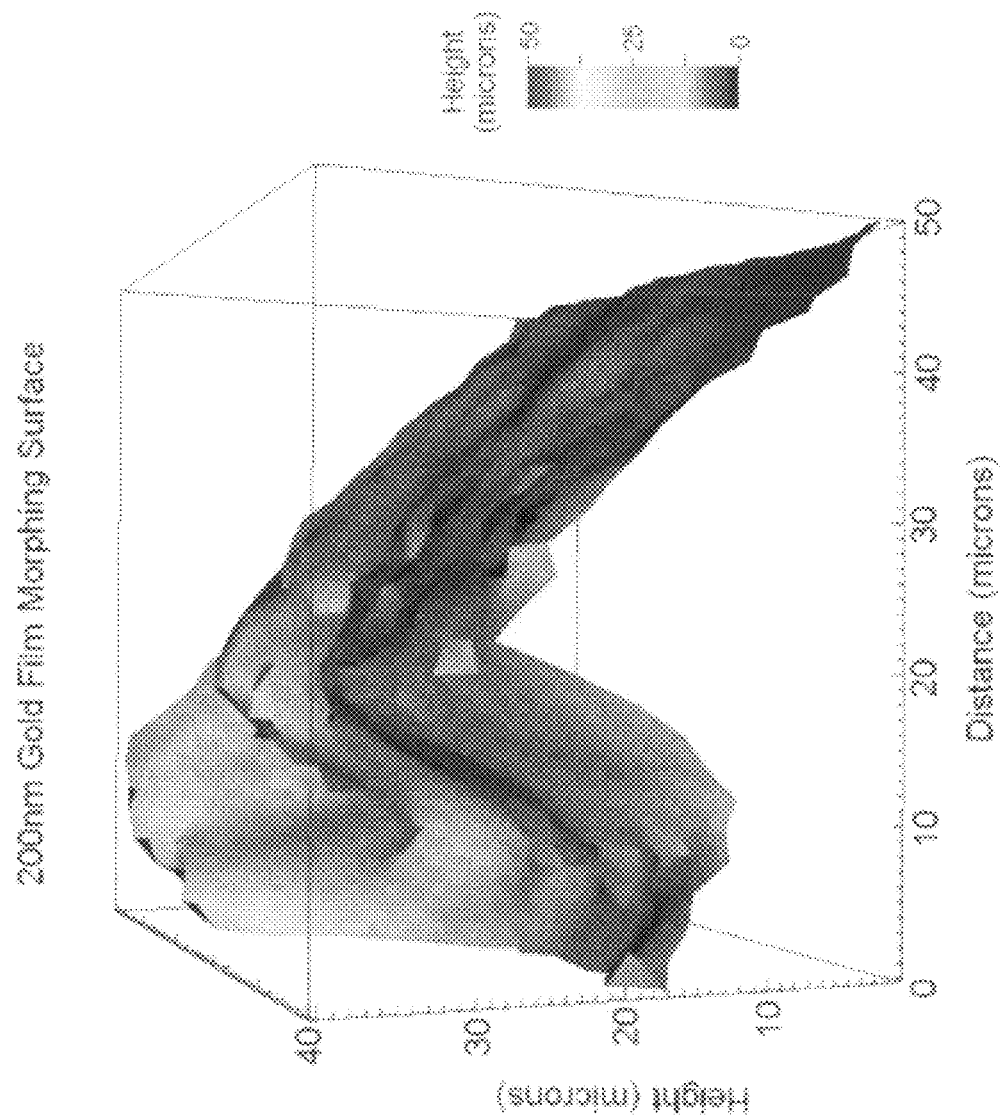
Figure 9C:
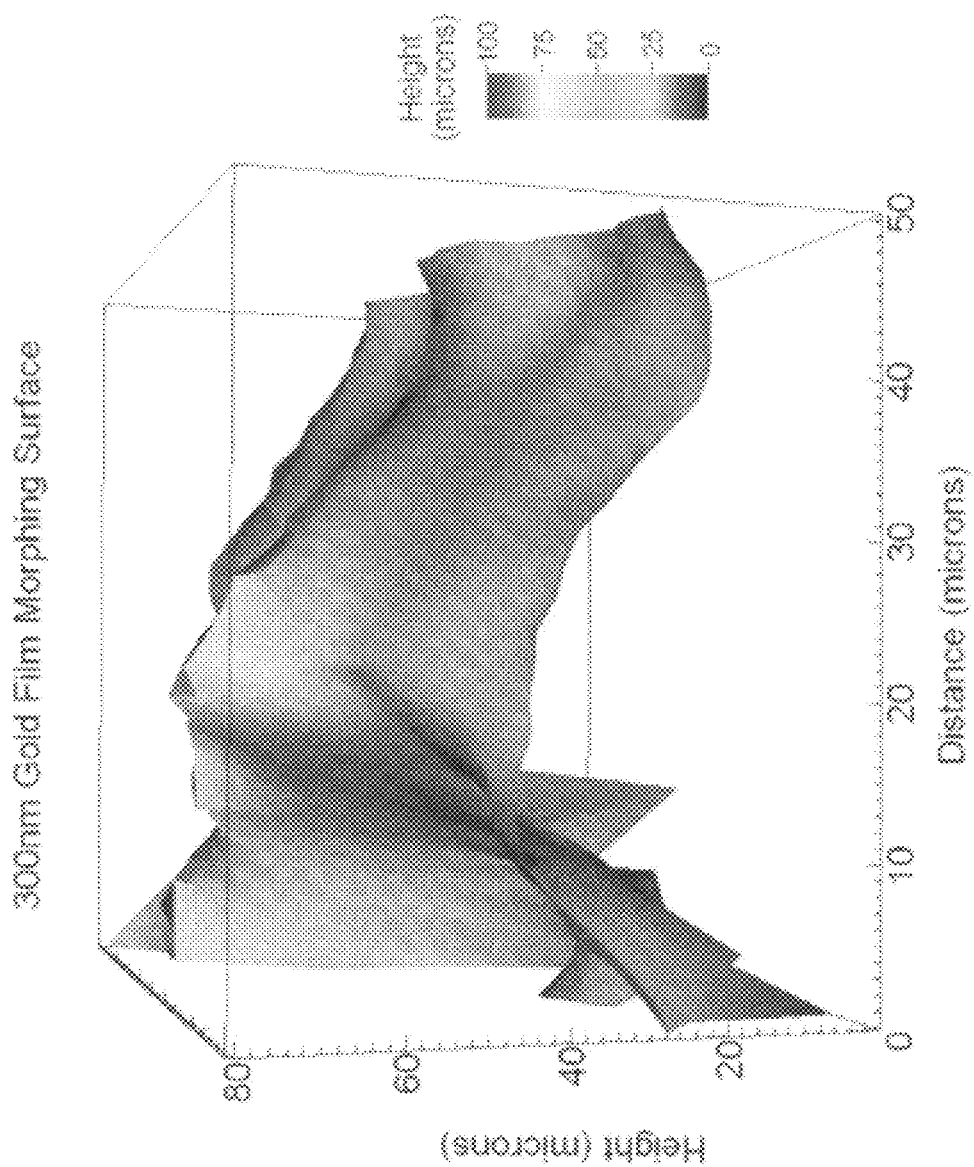
Figure 9D:
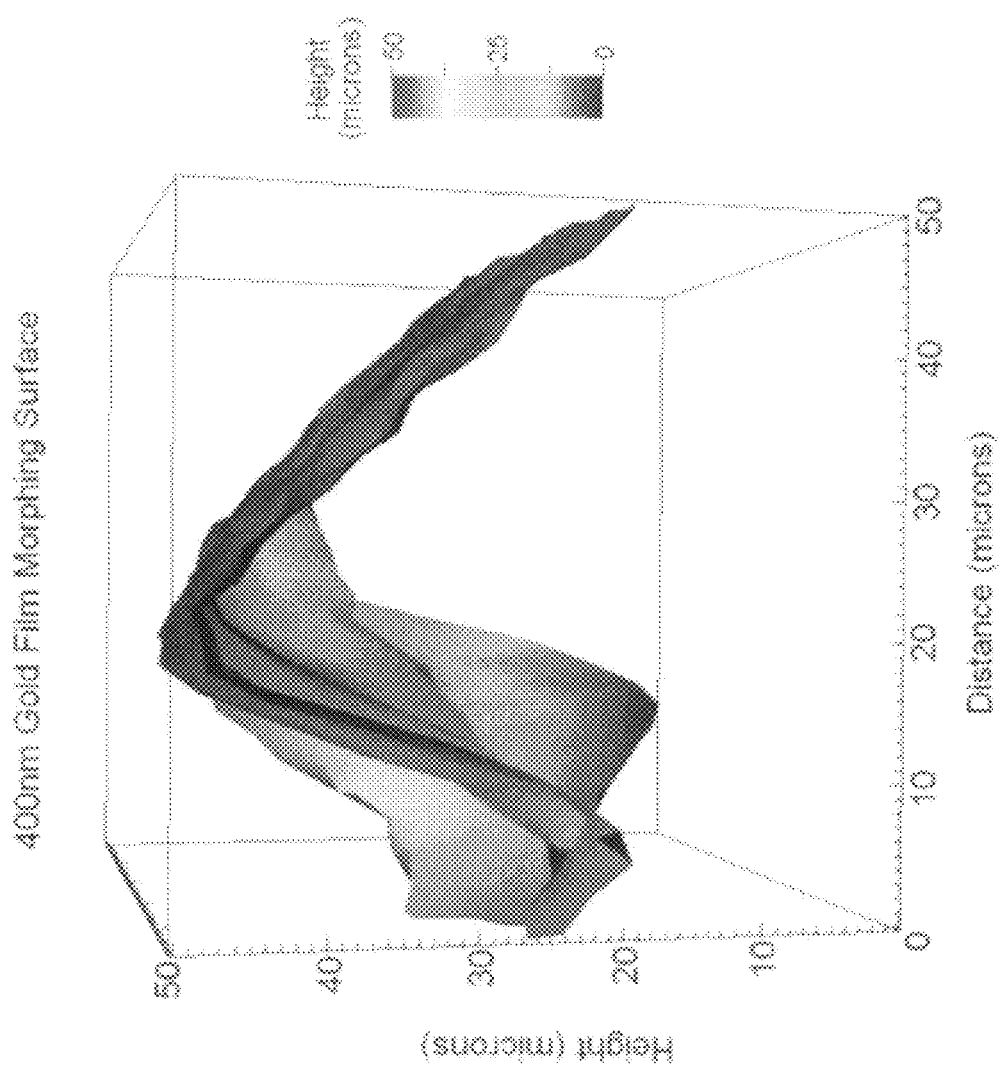
Figure 9E:
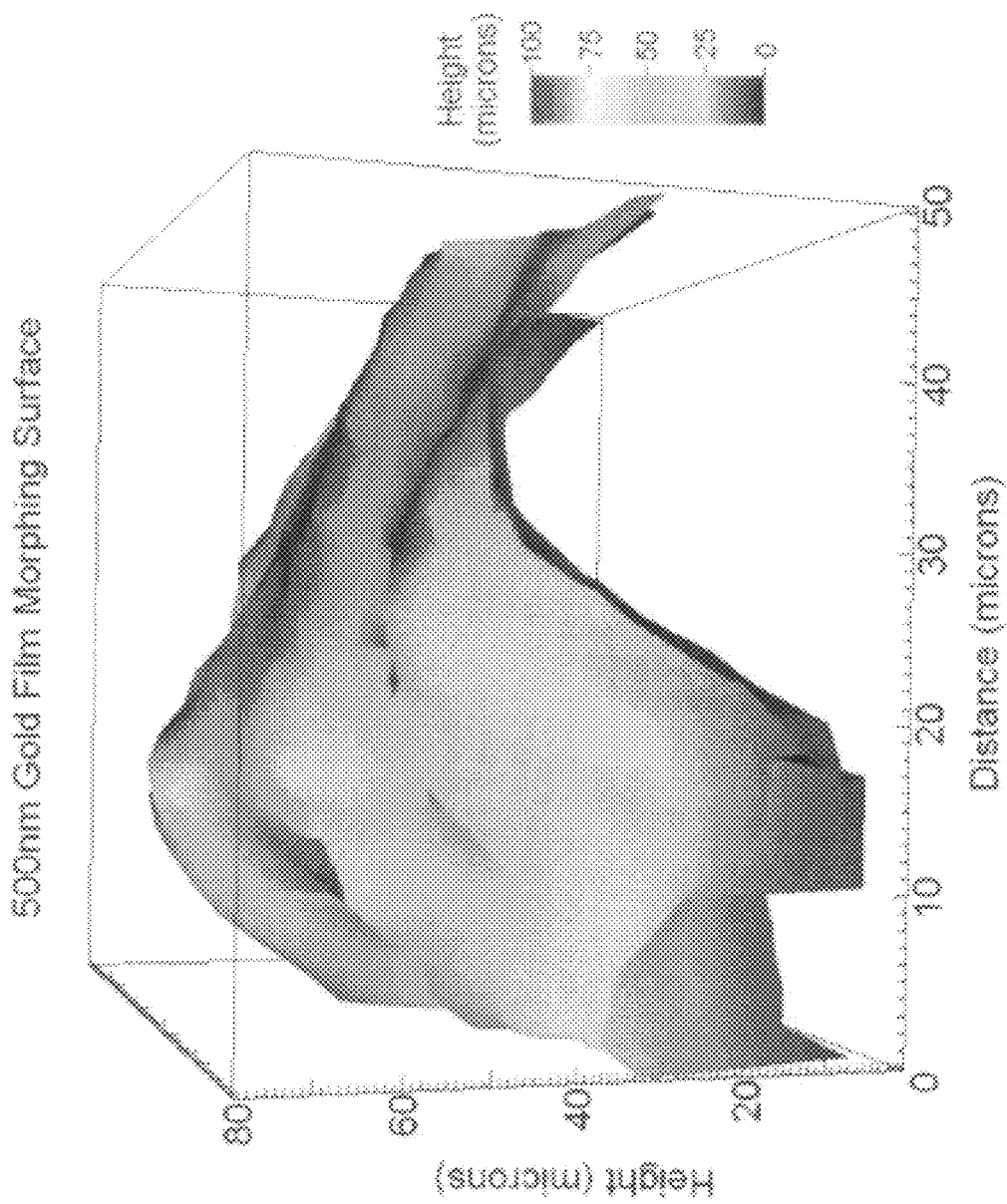

Wrinkle wavelengths that were observed, seen in FIG. 6 and FIG. 7, agree extremely well with the theoretical predictions, as shown in FIG. 10. This is in contrast to those observed by Bowden, who reported that the existing model given by Equation (5) greatly underestimated wrinkle wavelength. A possible reason for the disagreement between the results reported here and those by Bowden is the height averaging that occurs during the laser scanning process. The laser beam is 30 µm in diameter, and the scanner averages the surface heights across this area to obtain a single height value at each scan location. A possible source of error is the limit on the scan area imposed by the scanning system we used. A maximum scan area of 80×80 microns could be achieved while maintaining high resolution, but this was not sufficient for imaging multiple wavelength patterns. Also, a possible error of the wavelength measurements for the 400 and 500 nm gold film samples may be caused by wavelength values on the order of the maximum scan area. Surfaces created with 300-500 nm films possessed a slightly higher strain mismatch level than the other surfaces, but there appears to be no wavelength dependence on strain, further validating the existing model.

As seen in FIG. 11, the observed wrinkle amplitudes display a general linearly increasing trend with increasing film thickness, which is consistent with the existing model of thin film buckling given by Equation (6). Some of this variation may be due to the fact that the 300-500 nm thick films possessed ~4-5% strain mismatch, while the 100 and 200 nm films possessed only ~2-3% strain mismatch. This indicates that wrinkle amplitude is possibly dependent on the level of strain mismatch, as predicted. However, this difference between strain mismatch values is not extremely large, thus suggesting that there also may exist a directly proportional relationship between film thickness and wrinkle amplitude, which also confirms theoretical expectations. While the dependence of wrinkle height on the thickness of the film and the strain mismatch level is confirmed, the wrinkle amplitudes were observed to be ~5-10 times larger than expected. The reason for this has not yet been identified.

The reversibility of the wrinkling characteristics is shown in FIG. 12 and FIG. 13. Optical microscopy revealed that the wrinkles could be completely removed and would still return to a seemingly identical condition after the strain mismatch was re-applied, as shown in FIG. 12. It was also demonstrated that the wrinkle amplitudes could be controlled by the strain mismatch value, seen in the topographical image diagram in FIG. 13, with amplitude directly proportional to strain mismatch. The visible wrinkle peak seems to move slightly from the first to second images, which may be due to the fact that the scan location was not at the center of the sample and the thermal expansion of the PDMS caused it to shift slightly, but the reduction in amplitude is apparent. A source of error for this investigation is the small voltage variation that occurred over the course of a typical 2-hour scan, creating surface height variations on the order of a few microns. This is most visible in the ~1% strain mismatch condition of FIG. 13, where it is thought that the visible surface roughness features are due to this small fluctuation.

Fatigue testing of the wrinkles revealed no noticeable degradation in the wrinkling characteristics after ten cycles. The wrinkles in FIG. 14 appear to be fully formed, with no apparent decrease in wavelength or amplitude after cycling. It was observed that the wrinkles consistently reappeared in a similar pattern.

The small nested wrinkles identified in FIG. 15 have wavelengths of ~2-7 microns, a full order of magnitude smaller than the larger wrinkles present. This result is similar to that reported by Efimenko, who observed four generations of nested wrinkles on a PDMS substrate/UV oxidized PDMS film system that differed in size by an order of magnitude between each generation. Nested wrinkles were observed on each of the morphing surfaces, but at varying scales. For example, the small wrinkles on the 200 nm chromium film morphing surface were even smaller than those of the 100 nm gold film morphing surface.

We have demonstrated the fabrication of morphing surfaces and wrinkle control. The observations validated the existing buckling model for wavelength, but showed that the model underestimated amplitude values. While wrinkle amplitudes observed were an order of magnitude less than required for an actual MAV application, it is reasonable to imagine that the film thicknesses and strain mismatch could be scaled up to provide the desired wrinkle heights, especially considering the fact that amplitudes were ~10 times larger than predicted. For the present work, the presence of the small, nested wrinkles does not play a significant role. The amplitude of the nested wrinkles is estimated to be less than half of their wavelength, while desired wrinkle heights are on the order of ~150 microns. Thus, these small wrinkles will not noticeably affect the behavior of the boundary layer, but they are interesting to note.

Experimental Methods
PDMS Fabrication

Polydimethylsiloxane (PDMS) is a commercially available polymer and was used as the substrate material for the morphing surfaces. The specific brand used in this work was the Dow Corning Sylgard 184 elastomer, which comes in two parts: the base agent and the curing agent. The un-crosslinked liquid PDMS base and curing agent were poured into a square steel mold in a 10:1 ratio, measured by volume using syringes, and allowed to cure according to the following table:

TABLE 2

Cure times for Sylgard 184 elastomer

| Temperature | Cure Time |
|---|---|
| Room Temperature | >48 Hours |
| 100° C. (212° F.) | 35 Minutes |
| 125° C. (257° F.) | 20 Minutes |
| 150° C. (302° F.) | 10 Minutes |

It was discovered that the optimum curing temperature was ~100° C. because this provided a sufficiently fast curing time while avoiding unwanted deformation of the PDMS due to thermal expansion. It should be noted that the liquid PDMS requires significant mixing to ensure proper curing throughout the sample.

The mold was a cut section of 1.5" stainless steel square tubing cut to 1" lengths, which was adhered to a glass sheet with a Dow Corning RTV 738 sealant. The glass sheet acted as the bottom surface of the mold, and the Dow Corning RTV 738 sealant was used to seal the bottom edges of the steel square to prevent leakage of the PDMS.

After curing, a razor was used to separate the edges of the PDMS from the mold, and the PDMS was peeled off of the glass surface. Occasionally the edges of the PDMS would be cut off in order to create a flat substrate surface because they were slightly elevated where the PDMS had risen during the curing process, but this was only a small fraction of the PDMS sample.

Verification of the Thermal Expansivity of PDMS

Due to the variability in PDMS properties as a result of differences between batches and mix ratios, the relevant material properties needed to be experimentally verified. An experimental verification of reported values for the linear coefficient of thermal expansion of PDMS was performed. A 2.5×2.5×1.1 cm sample of PDMS (10:1 mix ratio) was heated in an oven up to temperatures of 207° C. Measurements of each linear dimension of the sample were taken at various temperatures, and the overall strain at each temperature was calculated. This experiment was repeated four times to ensure accuracy of the measurements.

Figure 16:
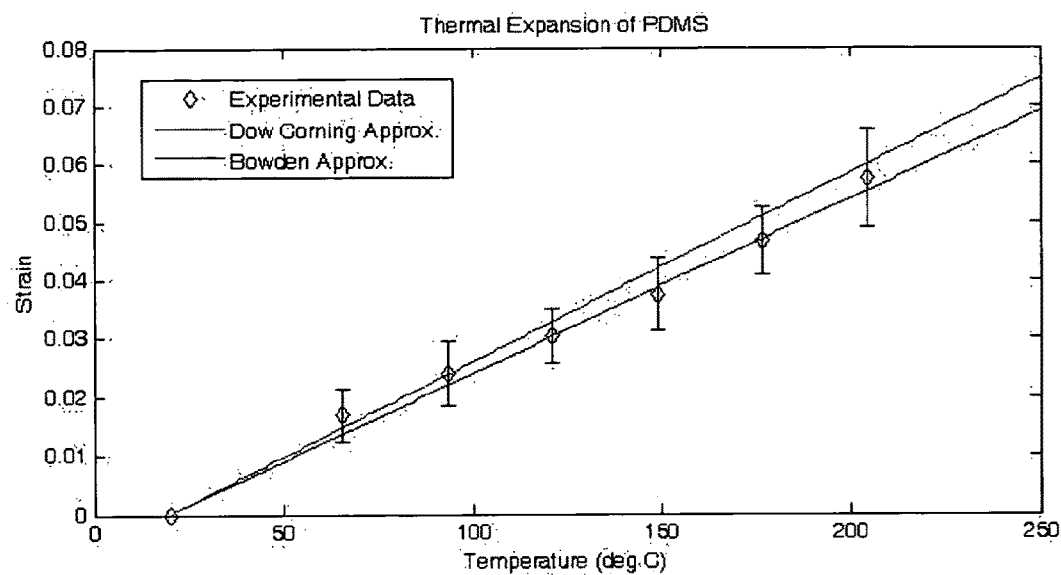
FIG. 16 is a graph that illustrates the experimental and approximate strain vs. temperature for PDMS.

The approximate value for the linear coefficient of thermal expansion provided by the manufacturer[13] is $325\times10^{-6}$ °C.$^{-1}$, and another approximate value of $3\times10^{-4}$ °C.$^{-1}$ was reported by Bowden. These approximations are plotted in FIG. 16 along with the experimental data:

Both of the approximations accurately model the performance of the experimentally fabricated PDMS across the entire temperature range. The approximation provided by Dow Corning is valid up to ~200° C., and that of Bowden is valid up to ~150° C.

Morphing Surface Fabrication

Resistance Heating Wire for Control of Strain Mismatch

Figure 17:
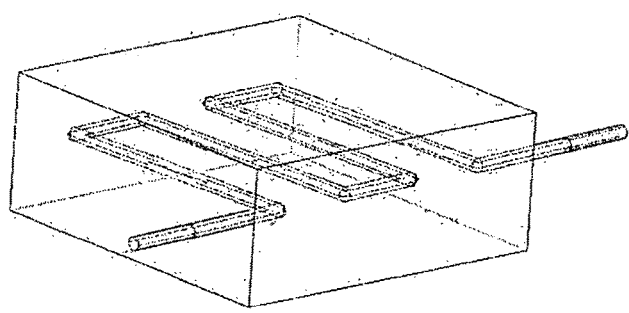
FIG. 17 is a graph that illustrates the shape of a zigzag resistance heating wire embedded in a PDMS substrate.
Figure 18:
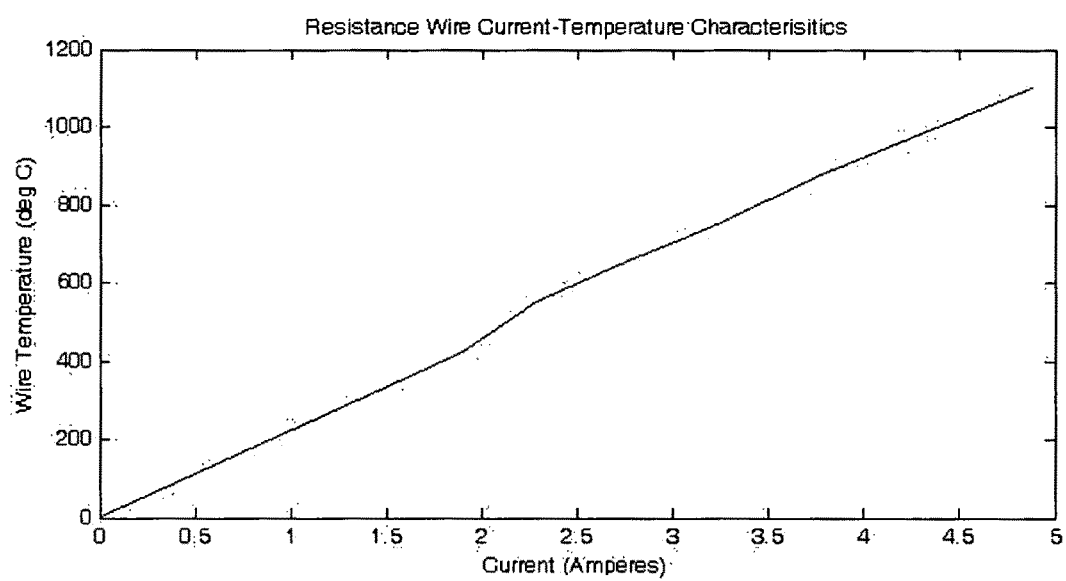
FIG. 18 is a graph that illustrates the current-temperature characteristics of resistance wire.

A strain mismatch between the film and PDMS substrate is required for the formation of surface wrinkles. Thermal expansion of the PDMS was used to create the necessary strain mismatch in this investigation by utilizing embedded resistance heating wire to provide the control mechanism of the PDMS expansion. An Omega Engineering, Inc. Nickel-Chromium resistance wire was bent into a zigzag configuration in a large enough size so as to traverse the majority of the PDMS sample. It was placed in the mold directly after the liquid PDMS so that the PDMS would solidify around it, as illustrated in FIG. 17.

Figure 19:
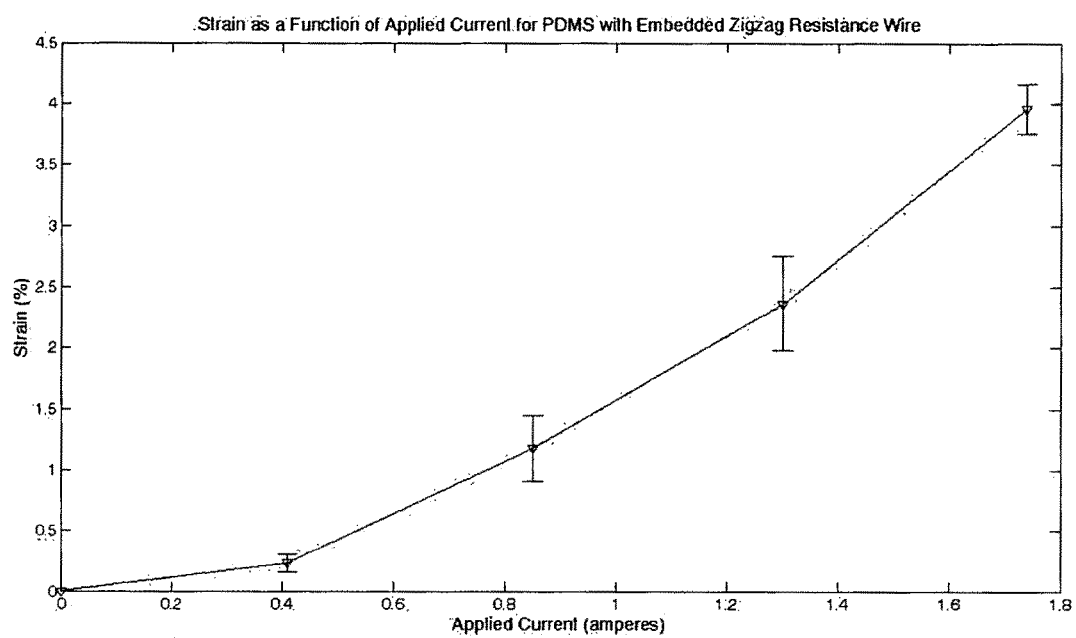
FIG. 19 is a graph that illustrates the strain for a morphing surface substrate as a function of current applied to a zigzag heating wire.
Figure 20:
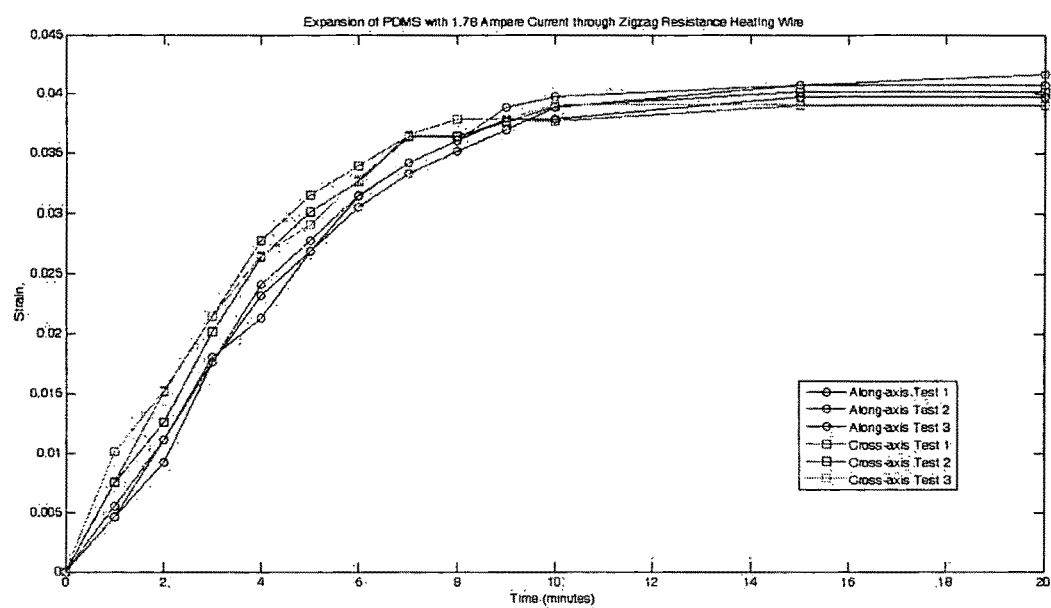
FIG. 20 is a graph that illustrates the expansion of PDMS using zigzag resistance wire heating at a current of 1.78 Amperes as a function of time.

The zigzag configuration was chosen because it provided nearly equi-biaxial strain of the sample. The manufacturer provided data for the current-temperature performance of a straight wire stretched horizontally in free air, but this data assumed temperatures above 425° C. and an applied current above 1.90 amperes. The data was plotted and extrapolated to allow determination of the wire characteristics at lower current and temperature values:

The PDMS was heated by using a BK Precision 1623A DC Regulated Power Supply to drive a current through the wire. To achieve a current up to ~1.78 Amps, two power supplies were wired together in a master/slave configuration. Experimental data for the zigzag configuration of wire embedded in PDMS is provided below. FIG. 19 displays the strain as a function of the applied current, and FIG. 20 illustrates the biaxial strain of the configuration and the time needed to reach full strain at the maximum current level provided by the power sources. While the present discussion has explained that a thermal stress provided by a stressor that operates thermally can be effective to cause the surface of the substrate (PDMS) and overlayer (metal) to modify its structure between a smooth state and a rough state, it is expected that other types of systems that are responsive to an applied mechanical stress (such as may be applied using any of motors, fluids in bladders under the surface, or other sources of mechanical stress that one can control) or that are responsive to an applied electromagnetic field (e.g., a structure comprising an electrostrictive or piezoelectric material) may also be used.

Sputter Coating Deposition of Metals

A Cressington 208HR Sputter Coater, located in the Caltech Geological & Planetary Sciences Division Analytical Facility, was used to deposit the 100 nm and 200 nm gold and chromium thin metal films directly onto the PDMS substrates. The sputtering process caused thermal expansion of the PDMS, creating an initial strain mismatch between the film and substrate, and succeeded in creating morphing surface samples with observable wrinkles. This method did not allow for control of this initial mismatch since the temperature inside the sputtering chamber could not be adjusted, and the deposited films experienced significant cracking throughout their entire area.

Contact Printing Deposition of Metals

Figure 21:
FIG. 21 is an illustrative diagram of a contact printing technique.

To control the initial strain mismatch and eliminate the presence of surface cracks, the PDMS sample was heated to the desired strain level and then the metal film was applied using a contact printing method. Contact printing involves the transfer of a thin metal film from a patterned stamp to a substrate. In this process a thin film of metal is deposited onto a stamp that is then placed in intimate contact with the substrate, resulting in the transfer of the metal film from the stamp to the substrate. This process is illustrated in the diagram of FIG. 21.

The sputter coater was used to deposit thin metal films on a glass stamp. The stamps-were cut from sheets of ⅛" thick glass into small squares ~1"×1". Gold and chromium films were deposited in varying thickness, which could be controlled by the sputter coating machine. It was discovered that chromium could not be successfully transferred because the film would not separate from the glass, but it adhered to the PDMS better than gold. Thus, gold was used as the main film material, deposited in 300-500 nm thicknesses, followed by deposition of a 10 nm chromium adhesion layer.

In order to create the initial strain mismatch, the power supply was set to heat the sample to the desired strain level, and once this value was reached the metal film was put into contact with the PDMS surface. A small compressive force was used to ensure full conformal contact between the stamp and the substrate; the stamp was held in this position for ~1 minute to allow the film to heat, which assisted in the transfer process, before being removed. Most of the film would transfer from the stamp to the PDMS, but certain portions of the film would de-bond from the substrate upon removal of the stamp, creating sparsely located structures resembling large wrinkles. Relieving the thermal strain in the PDMS by allowing it to cool created the strain mismatch, and re-heating the PDMS to the desired thermal strain level could relieve the strain mismatch.

This metal deposition process was able to prevent the films from rupturing. It should be noted that the strain mismatch level is determined by accounting for thermal expansion of the metal, but the thermal expansion value is small for the temperatures used in this procedure.

Optical Microscopy/Micrography

Optical micrographs of the morphing surface samples were obtained by placing a Canon PowerShot digital camera directly to the eyepiece of a Nikon SMZ 800 optical microscope. In order to resolve the wrinkles, the camera and microscope were both set to maximum zoom. The scale of the samples was determined by first obtaining images of the scale markings on a small ruler at a low zoom setting and the full zoom setting. A relationship between actual distance and number of pixels of the image was determined using GIMP, a free-ware photo manipulation program. The morphing surface micrographs were then processed using GIMP, which allowed the pixels to be measured and translated into actual physical distances.

Laser Scanning System Characterization

Figure 22:
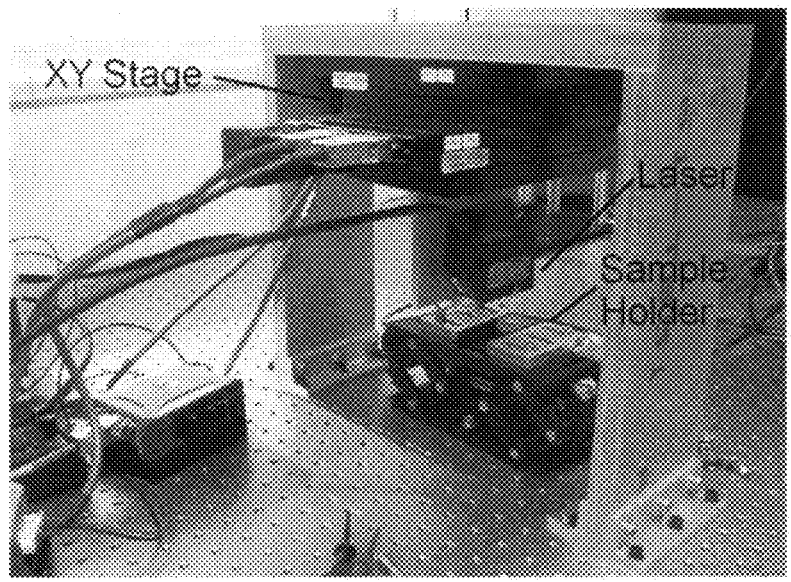
FIG. 22 is an image of a laser scanning system used to measure morphing surfaces.

A custom built scanning laser displacement system was used to obtain topographical images of the surfaces of interest. An image of the scanning laser system setup is shown in FIG. 22. A Keyence LK-G32 CCD Laser Displacement Sensor was used to provide the laser and measure displacements. The LK-G32 has a laser spot diameter of ~30 microns and a repeatability of 0.05 micron, with an overall measurement range of ±5 mm. This laser was mounted on two Griffin Motion linear translation stages providing motion in the xy-plane. The stages were mounted on the underside of a frame that elevated the laser sensor above scanning surface. Two Performance Motion Devices ION Digital Drive single-axis motion controllers for brushless DC motors controlled the stages. The scanning system was mounted on a Newport ST-UT2 Optical Table with damping control in order to minimize the effect of external vibrations during experimentation. The entire system, including scanning and data acquisition, was controlled through LabVIEW.

The system operates by recording the distance of the surface being scanned at various locations. This information is visualized using a program called VisIt, which creates a 3-dimensional image by displaying the measured displacement of the surface at its corresponding xy-location. The user is able to specify what size of xy-grid to be scanned, and also the distance between sampling points. The limit of these two variables is dependent on the linear translation stages, which allows for a very large scan grid (>3×3 cm) and a minimum increment of 0.1 microns between scanning locations. A lower step size between scans affords a better reproduction of the image, but drastically increases the scan time.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. An aerodynamic surface configured to permit control of boundary layer transition, comprising:
    a substrate having a pre-defined strain, said substrate having a first surface configured to be fixed to an airfoil, and having a second surface;
    an overlayer adjacent said second surface of said substrate, said overlayer configured to provide a free surface to an aerodynamic fluid flow, said overlayer and said substrate having a relative strain mismatch as produced, said overlayer and said substrate having different respective responses to an applied stress, said overlayer configured to reversibly morph between a smooth surface and a rough surface, said rough surface comprising wrinkles; and
    a stressor configured to apply a stress to at least a selected one of said substrate and said overlayer;
    whereby said aerodynamic surface is configured to present a selected one of said smooth surface and said rough surface to said aerodynamic fluids flow in response to said applied stress.

2. The aerodynamic surface configured to permit control of boundary layer transition of claim 1, wherein said substrate is a soft material.

3. The aerodynamic surface configured to permit control of boundary layer transition of claim 1, wherein said substrate is polydimethylsiloxane (PDMS) elastomer.

4. The aerodynamic surface configured to permit control of boundary layer transition of claim 1, wherein said overlayer is a metal.

5. The aerodynamic surface configured to permit control of boundary layer transition of claim 4, wherein said metal is a selected one of chromium and gold.

6. The aerodynamic surface configured to permit control of boundary layer transition of claim 1, wherein said stressor is configured to apply a thermal stress to said substrate.

7. The aerodynamic surface configured to permit control of boundary layer transition of claim 6, wherein said stressor is an electrical heater.

8. The aerodynamic surface configured to permit control of boundary layer transition of claim 1, wherein said stressor is configured to apply a mechanical stress to said substrate.

9. The aerodynamic surface configured to permit control of boundary layer transition of claim 1, wherein said stressor is configured to apply a thermal stress to said overlayer.

10. The aerodynamic surface configured to permit control of boundary layer transition of claim 1, wherein said stressor is configured to apply a mechanical stress to said overlayer.

11. A method of controlling a boundary layer transition at an aerodynamic surface, the method comprising the steps of:
    providing on an airfoil a structure defining an aerodynamic surface, said structure comprising a substrate having a pre-defined strain, said substrate having a first surface configured to be fixed to said an airfoil, and having a second surface; an overlayer adjacent said second surface of said substrate, said overlayer configured to provide a free surface to an aerodynamic fluid flow, said overlayer and said substrate having a relative strain mismatch as produced, said overlayer and said substrate having different respective responses to an applied stress, said overlayer configured to reversibly morph between a smooth surface and a rough surface, said rough surface comprising wrinkles; and a stressor configured to apply a controlled stress to at least a selected one of said substrate and said overlayer; and
    applying a controlled stress to a selected one of said substrate and said overlayer, said controlled stress calculated to control a morphology of said free surface of said structure between a smooth state and a rough state;
    whereby said aerodynamic surface presents a selected one of said smooth surface and said rough surface to said aerodynamic fluids flow in response to said applied controlled stress to control a boundary layer transition of said aerodynamic fluid flowing over said aerodynamic surface.

12. The method of controlling a boundary layer transition at an aerodynamic surface of claim 11, wherein said substrate is a soft material.

13. The method of controlling a boundary layer transition at an aerodynamic surface of claim 11, wherein said substrate is polydimethylsiloxane (PDMS) elastomer.

14. The method of controlling a boundary layer transition at an aerodynamic surface of claim 11, wherein said overlayer is a metal.

15. The method of controlling a boundary layer transition at an aerodynamic surface of claim 14, wherein said metal is a selected one of chromium and gold.

16. The method of controlling a boundary layer transition at an aerodynamic surface of claim 11, wherein said stressor is configured to apply a thermal stress to said substrate.

17. The method of controlling a boundary layer transition at an aerodynamic surface of claim 16, wherein said stressor is an electrical heater.

18. The method of controlling a boundary layer transition at an aerodynamic surface of claim 11, wherein said stressor is configured to apply a mechanical stress to said substrate.

19. The method of controlling a boundary layer transition at an aerodynamic surface of claim 11, wherein said stressor is configured to apply a thermal stress to said overlayer.

20. The method of controlling a boundary layer transition at an aerodynamic surface of claim 11, wherein said stressor is configured to apply a mechanical stress to said overlayer.

* * * * *